United States Patent [19]
Sakuma

[11] Patent Number: 5,572,019
[45] Date of Patent: Nov. 5, 1996

[54] ENCODER WITH VARYING WIDTH LIGHT RECEIVER AND APPARATUS HAVING THE ENCODER

[75] Inventor: Tsuyoshi Sakuma, Chichibu, Japan

[73] Assignee: Canon Kabushiki Kaisha, Tokyo, Japan

[21] Appl. No.: 371,609

[22] Filed: Jan. 12, 1995

Related U.S. Application Data

[60] Continuation of Ser. No. 145,048, Nov. 3, 1993, abandoned, which is a division of Ser. No. 849,159, Mar. 10, 1992, abandoned.

[30] Foreign Application Priority Data

Mar. 12, 1991 [JP] Japan .................. 3-073941
Mar. 12, 1991 [JP] Japan .................. 3-073942

[51] Int. Cl.⁶ .................................................. G01D 5/34
[52] U.S. Cl. .................. 250/231.16; 250/237 G
[58] Field of Search .................. 250/237 G, 231.14, 250/231.16; 356/395; 341/13

[56] References Cited

U.S. PATENT DOCUMENTS

| | | | |
|---|---|---|---|
| 4,037,325 | 7/1977 | Weber et al. ............... | 250/237 G |
| 4,375,592 | 3/1983 | Cox et al. ................... | 250/231.16 |
| 4,704,523 | 11/1987 | Uchida ....................... | 250/231.16 |
| 4,806,034 | 2/1989 | Plummer ..................... | 250/231.16 |
| 5,021,650 | 6/1991 | Rieder et al. ............... | 250/231.16 |
| 5,059,791 | 10/1991 | Ishizuka et al. ........... | 250/237 G |
| 5,113,693 | 5/1992 | Hata ........................... | 250/231.14 |
| 5,120,954 | 6/1992 | Taniguchi ................... | 250/231.16 |
| 5,332,895 | 7/1994 | Reider et al. .............. | 250/237 G |
| 5,347,355 | 9/1994 | Eguchi ........................ | 250/231.16 |

FOREIGN PATENT DOCUMENTS

| | | | |
|---|---|---|---|
| 0176516 | 10/1983 | Japan ........................ | 250/231.16 |
| 0126114 | 5/1990 | Japan ........................ | 250/231.16 |
| 2-290510 | 11/1990 | Japan ........................ | 250/231.16 |

Primary Examiner—Stephone B. Allen
Attorney, Agent, or Firm—Fitzpatrick, Cella, Harper & Scinto

[57] ABSTRACT

An encoder has a detector that detects displacement of a movable portion and a generator that generates multiple phase periodic signals with at least three different phases. The phase periodic signals change according to the displacement and a selector selects one of the multiple phase periodic signals to which a predetermined offset is added. In one encoder arrangement, a light beam is radiated toward a scale on which a grating is formed along a relative displacement direction. A light-receiving element receives light modulated by the grating to obtain relative displacement information between the light beam and the scale. The light receiving element has an opening width that changes in a direction perpendicular to the displacement direction.

6 Claims, 23 Drawing Sheets

FIG. 8
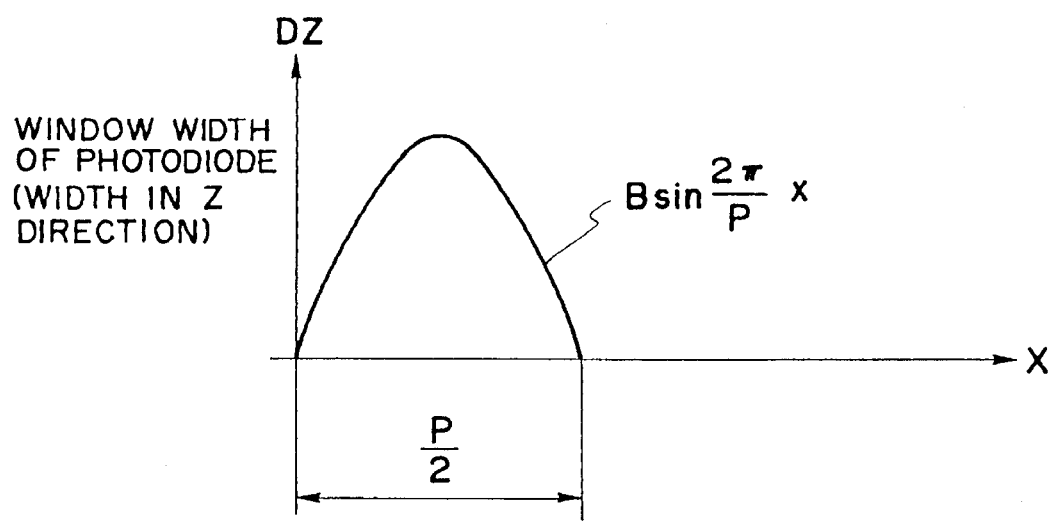
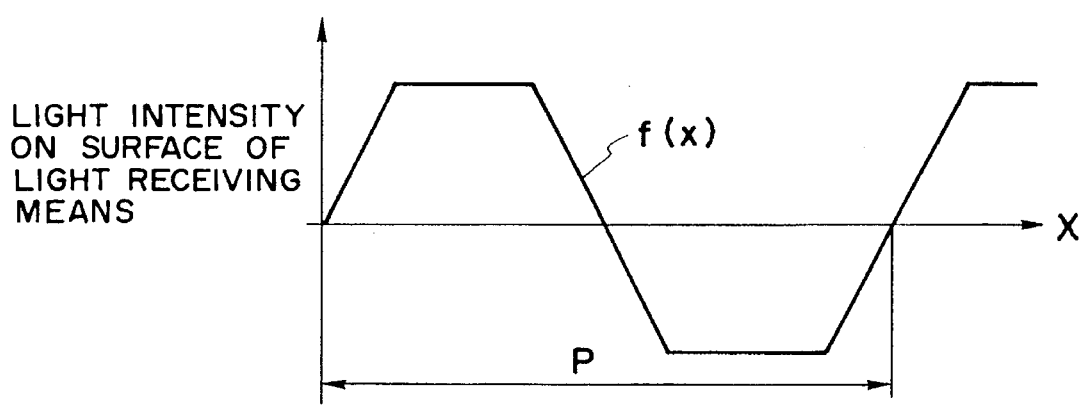
FIG. 9
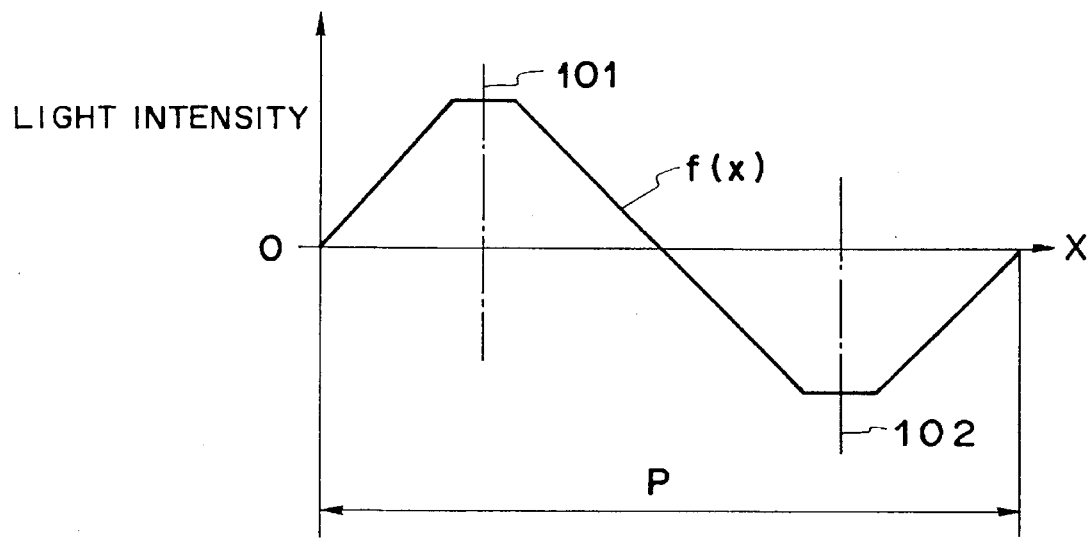

$Z = a \sin \frac{2\pi}{P} x$ $Z = b \sin \frac{2\pi}{P} x$ $\frac{P}{2}$

61 A PHASE OUTPUT

63 INVERTED A PHASE OUTPUT

65 A-INVERTED A PHASE OUTPUT 5,572,019

ENCODER WITH VARYING WIDTH LIGHT RECEIVER AND APPARATUS HAVING THE ENCODER

This application is a continuation of application Ser. No. 08/145,048 filed Nov. 3, 1993, which is a divisional of application Ser. No. 07/849,159 filed Mar. 10, 1992, both abandoned.

BACKGROUND OF THE INVENTION

1. Filed of the Invention

The present invention relates to an encoder, often utilized in the fields of industrial machines and measurement devices, for detecting the direct moving state or the rotating state of an object to be measured, and an apparatus having the encoder.

2. Related Background Art

Conventionally, in, e.g., a magnetic disk or an optomagnetic disk, a recording/reproduction magnetic head as a movable portion must be precisely moved along tracks. In particular, as the interval between adjacent tracks becomes smaller, the magnetic head must be aligned and fixed above an objective track with higher precision. Conventionally, aligning control at that time is performed by an aligning apparatus using an encoder.

FIG. 15 is a schematic view showing a principal part of a magnetic disk recording system when a conventional aligning apparatus is used.

In FIG. 15, a magnetic head 92 performs a recording/reproduction operation on a magnetic disk 91, and is arranged on one end of an arm 94. An actuator 93 moves the arm 94 coupled to the magnetic head 92, thereby aligning the magnetic head 92 on a target track on the magnetic disk 91. A linear encoder 95 detects position information such as the moving amount or position of the arm 94. More specifically, the position information of the magnetic head 92 is obtained by the linear encoder 95.

FIG. 16 is a graph for explaining output signals of two phases obtained from the linear encoder 95. These output signals are obtained by an encoder shown in FIG. 21, as will be described later.

As shown in FIG. 16, an A phase signal 61, and a B phase signal 62 are output in correspondence with the displacement of the actuator. The phase difference between the two signals is set to be 90°. One of the signals 61 and 62 is selected, and is processed in a feedback loop like a processing circuit shown in FIG. 18.

In FIG. 18, one of the A and B phase signals 61 and 62 from the linear encoder 95 is selected by a switch 9, and the selected signal is input to a driving circuit 7 through a filter 8. The actuator 93 is driven on the basis of a signal from the driving circuit 7, thereby determining the position of the arm 94, i.e., aligning the magnetic head 92. The aligning operation is performed based on the zero-crossing point of the output signal from the encoder 95 at that time. The zero-crossing point means a point where the output signal from the encoder 95 has a zero voltage.

In this manner, conventionally, the displacement of the arm 94 as a movable portion, and the output signals from the encoder 95 are set to have the relationship shown in FIG. 16, and the arm, i.e., the magnetic head is aligned by utilizing the output signals from the encoder at that time.

In general, points where an aligning operation can be attained based on signals obtained from the encoder 95 are only the zero-crossing points of the A and B phase signals 61 and 62. By moving the zero-crossing points of the two phase signals, the aligning operation is performed at an arbitrary position.

FIG. 19 is a schematic diagram of a signal processing circuit for the two phase signals at that time. The circuit shown in FIG. 19 has an adder 10 for adding an offset signal 11 to an output voltage from the encoder 95.

A conventional method of aligning a movable portion to an arbitrary position using the offset signal 11 and the two phase signals 61 and 62 will be described below with reference to FIG. 19 showing the signal processing circuit, and FIG. 16 showing output signal waveforms.

In FIG. 16, one zero-crossing point 14 of the B phase signal 62 will be referred to as a P point hereinafter. The movable portion is aligned with the P point, and is moved in a positive direction (a right direction in FIG. 16). Thus, an aligning feedback loop shown in FIG. 19 is assumed to normally operate according to the polarity of the B phase signal 62 shown in FIG. 16, i.e., the inclination of the B phase signal 62 in FIG. 16 as a position signal at the P point 14. Therefore, when an aligning operation is performed at an R point 16, the A phase signal 61 must be inverted by a non-inverting and inverting circuit 12.

Thus, a point to perform an aligning operation is assumed to be the P point 14. At this time, the offset signal 11 is zero. As the magnitude of the offset signal (voltage) 11 is increased in the negative direction, the aligning point is moved in the positive direction. When the aligning point is moved to a Q point 15 (the voltage of the offset signal 11 is $-V_c$ (13)), the A phase signal 61 is selected by the switch 9, and is inverted by the non-inverting and inverting circuit 12.

When $+V_c$ (13) is output as the offset signal, the movable portion can be aligned with the Q point 15 according to the A phase signal 61 in turn. Upon repetition of the above-mentioned operations, the movable portion can be continuously aligned with an arbitrary position.

Encoders can be roughly classified into optical and magnetic encoders. The encoders can also be roughly classified into linear and rotary encoders. Any encoder can obtain two phase outputs having triangular waveforms, as shown in FIG. 16. However, waveforms obtained from the encoder rarely have perfect triangular waveforms shown in FIG. 16, and in practice, often have pseudo sine waveforms approximate to the sine waveforms, as shown in FIG. 17. An encoder, which can provide two phase outputs having perfect sine waveforms, is also available. An aligning operation 10 with an arbitrary position can also be performed based on two phase signals having sine waveforms in the same method as described above. However, in contrast to the triangular waveform, the waveform of, e.g., a B phase signal 62 has different inclinations at a P point 14 and a Q point 15. It is undesirable that the waveform has different inclinations since the loop gain of the feedback loop shown in FIG. 19 then changes.

Furthermore, a voltage at the Q point 15 is closer to the peak voltage of the waveform than that of the triangular waveform. FIG. 20 shows the B phase signal 62 when the aligning operation is performed at the Q point 15. If the movable portion is displaced due to, e.g., a disturbance, and exceeds an S point 17, the feedback loop shown in FIG. 19 performs a positive feedback operation with respect to the Q point 15, i.e., operates separate from the Q point 15, and cannot recover to the Q point 15.

The inclination of the waveform at the Q point 15 in FIG. 17 is smaller by about 30% than that at the P point 14 since the waveform is a sine wave. Thus, a recovery force against a disturbance is small, and hence, the Q point 15 is weaker against disturbance than the P point 14. For this reason, it is difficult and not desirable to perform an aligning operation near the Q point 15 in FIG. 17.

In the aligning apparatus utilizing an encoder, when two phase signals can only be obtained from the encoder, it is difficult to reliably align a movable portion with an arbitrary position using the two phase signals since these signals are weak against, e.g., disturbance.

Some conventional encoders will be described below.

FIG. 21 is a schematic view of the principal part of a conventional linear encoder for detecting the position or amount of movement an object to be measured in a linear direction. In FIG. 21, a light-emitting means 1 has a light source, a collimator lens, and the like, and radiates a collimated beam. A main scale 2 is arranged in association with an object to be measured, and has a plurality of slit-like (rectangular) openings (to be also referred to as windows hereinafter) 2a at a pitch P in a moving direction x. A light-receiving means (detection head) 5 has a mask 3 having two slit-like openings (to be also referred to as windows hereinafter) 3a and 3b, and two sensors, i.e., an A phase photodiode 41 and a B phase photodiode 42 corresponding to the openings 3a and 3b, so as to detect a moving state of the main scale 2.

A light beam emitted from the light-emitting means 1 passes through the openings 2a of the main scale 2, and becomes incident on the A and B phase photodiodes 41 and 42. The main scale 2 has the slit-like windows at the pitch P, and the mask 3 has the slit-like windows 3a and 3b for the A and B phase photodiodes 41 and 42. For this reason, output currents from the A and B phase photodiodes 41 and 42 are proportional to the amounts of light radiated within the windows 3a and 3b of the mask 3.

Assume that a light beam from the light-emitting means is a perfectly collimated beam for the sake of simplicity. When the collimated beam is incident on the main scale 2, it can pass through only the windows 2a of the main scale 2. For this reason, the light-receiving means 5 receives light beams from regions corresponding to the windows 2a of the main scale 2.

FIG. 22 is a schematic plan view of the main scale 2 and the light-receiving means 5. The width ($D_1$) of each window 2a in the x-direction of the main scale 2, and the width ($D_2$) of each of the windows 3a and 3b of the mask 3 are half the pitch P of the windows 2a of the main scale 2 ($D_1=D_2=P/2$).

At this time, the output currents I from the A and B phase photodiodes 41 and 42 are proportional to the light amount of light beams radiated within the windows 3a and 3b of the mask 3 (the shape of the window will be referred to as a "light-receiving surface window shape" hereinafter). For this reason, when the position of the main scale 2 relative to the light-receiving means 5 is displaced in the x-direction, the relationship between the displacement and the output currents I from the A and B phase photodiodes (41 and 42) is as shown in FIG. 23.

As shown in FIG. 23, the output currents I from the A and B phase photodiodes (41 and 42) have triangular waveforms 61 and 62. As shown in FIG. 22, the interval in the x-direction between the A and B phase photodiodes (41 and 42) is (n+0.25)×P(n=1, 2, 3, . . . , and P is the pitch of the openings 2a of the main scale 2). In this manner, the output currents I from the A and B phase photodiodes (41 and 42) have a phase relationship of 90°, as shown in FIG. 23. Normally, measurement of a displacement or speed and aligning control of a movable portion (not shown) arranged in association with the main scale 2 are performed using the A and B phase outputs (61 and 62).

For example, a counter is driven by a rectangular waveform obtained by comparing the A and B phase outputs (61 and 62) at the center of waveforms, thereby measuring a displacement. When the A and B phase outputs (61 and 62) are differentiated over time, the speed can be detected. At this time, the waveforms of the A and B phase outputs (61 and 62) largely influence a speed signal. For example, when the waveform at that time changes from a predetermined pattern, its differentiated waveform also changes, and the speed signal changes accordingly.

When the waveform changes in a case wherein one of the A and B phase outputs (61 and 62) is used as a position feedback signal to perform aligning and measurement, a loop gain of a feedback system at that time undesirably changes. In this manner, when the waveforms of the A and B phase outputs (61 and 62) change from predetermined patterns, detection precision of a moving state deteriorates.

However, in general, in FIG. 21, a light beam from the light-emitting means 1 is not a perfectly collimated beam. For example, a perfectly collimated waveform cannot be obtained due to the manufacturing precision of a lens, a light source which is not a spot light source, and the like. In addition, when a light beam passes through the openings 2a of the main scale 2, it diverges due to diffraction.

If a light beam emitted from the light-emitting means 1 is a perfectly collimated beam, a brightness pattern formed on the surface of the light-receiving means 5 becomes as shown in FIG. 25. However, since the light beam is not a perfectly collimated beam, the brightness pattern often becomes as shown in FIG. 26. In the case of FIG. 25, the A and B phase outputs (61 and 62) have triangular waveforms, as shown in FIG. 23. In contrast to this, in the case of the brightness pattern shown in FIG. 26, the A and B phase outputs (61 and 62) have waveforms, as shown in FIG. 24.

In addition, the brightness pattern formed on the surface of the light-receiving means 5 also changes depending on the interval (distance) between the main scale 2 and the light-receiving means 5. For example, even when a light beam emitted from the light-emitting means 1 is not a collimated beam, if the distance is assumed to be zero, the brightness pattern formed on the surface of the light-receiving means 5 is as shown in FIG. 25.

However, it is difficult in terms of the arrangement to set the distance to be zero or almost zero. The distance between the main scale 2 and the light-receiving means 5 often has a variation caused by assembling precision. For this reason, the brightness pattern on the surface of the light-receiving means 5 changes, and the output waveforms from the photodiodes 41 and 42 vary, resulting in measurement errors.

FIG. 27 is a schematic view of another conventional encoder. The encoder shown in FIG. 27 has substantially the same arrangement as that of the encoder shown in FIG. 21, except that the positions of openings (windows) 31a and 31b of a mask 31 provided to the light-receiving means 5 are different from those in the encoder shown in FIG. 21.

In the encoder shown in FIG. 27, when the light-receiving means 5 is pivoted through an angle $\Delta_y$ about the y-axis as a mounting error upon assembling, the phase relationship between A and B phase outputs changes almost in proportion to the angle $\Delta_y$. Such a displacement of the phase relationship also occurs when the light beam from the light-emitting means 1 is not a collimated beam in the encoder shown in FIG. 21. More specifically, the phase relationship between the A and B phase outputs is displaced.

FIG. 28A is a schematic view of an encoder in which the displacement of the phase relationship between the A and B phase outputs caused by the assembling error is corrected. In the encoder shown in FIG. 28A, the shape and positions of openings (windows) of a mask 32 arranged in front of the light-receiving means 5 are properly determined. More specifically, the A and B phase photodiodes 41 and 42 are arranged in the z-direction like in the encoder shown in FIG. 27. In FIG. 28A, furthermore, windows for inverted (or inversion) A and B phase photodiodes 43 and 44 are arranged in the diagonal direction of the A and B phase photodiodes 41 and 42.

FIG. 28B shows the window state at this time. As shown in FIG. 28B, the windows are arranged so that the outputs from the inverted A and B phase photodiodes (43 and 44) are respectively inverted to those from the A and B phase photodiodes (41 and 42). More specifically, when the width of each window 2a of the main scale 2 is given by D/2(P=D), the interval in the x-direction between the A and B phase photodiodes 41 and 42 is given by (n+0.25)×P(n=0, 1, 2, 3, ...), the interval between the A phase photodiode 41 and the inverted A phase photodiode 43 is given by (n+0.5)×P(n=0, 1, 2, 3, ...), and the interval between the B phase photodiode 42 and the inverted B phase photodiode 44 is given by (n +0.5) ×P(n=0, 1, 2, 3, ...).

With this arrangement, the phase relationship error caused by a pivoting error about the y-axis upon assembling is corrected. The reason for this will be described below.

An operation will be described first. The outputs from the photodiodes 41, 42, 43, and 44 shown in FIGS. 28A and 28B are input to a processing circuit shown in FIG. 29. At this time, an A phase output 61 from the A phase photodiode 41 and an inverted A phase output 63 from the inverted A phase photodiode 43, and a B phase output 62 from the B phase photodiode 42 and an inverted B phase output 64 from the inverted B phase photodiode 44 are respectively differentially amplified by differential amplifiers 7. The difference between the A phase output 61 and the inverted A phase output 63, i.e., an A—inverted A phase output 65, and the difference between the B phase output 62 and the inverted B phase output 64, i.e., a B—inverted B phase output 66, become two phase sensor outputs.

At this time, in the encoder shown in FIG. 28A, as the first advantage, the influence of a change in angle $\Delta_y$ of a relative mounting error between the main scale 2 and the light-receiving means 5 or of a change in distance between the main scale 2 and the light-receiving means 5 with respect to the phase relationship between the two phase outputs is much smaller than that in the encoders shown in FIGS. 21 and 27. As the second advantage, since the final outputs are differential outputs, electrical noise is small. As the third advantage, symmetry of the output waveforms is satisfactory. These three advantages will be described below.

For the sake of simplicity, the outputs from the photodiodes 41, 42, 43, and 44 are assumed to have sine waveforms. Thus, the output signals can be explained by a vector diagram of alternating current theory. FIG. 30A shows the vector diagram of signals shown in FIG. 29. In FIG. 30A, the outputs 61, 62, 63, and 64 have an ideal relationship therebetween. More specifically, the A and B phase outputs 61 and 62 have a phase relationship of 90° therebetween, the A phase output 61 and the inverted A phase output 63 have a phase relationship of 180° therebetween, and the B phase output 62 and the inverted B phase output 64 have a phase relationship of 180° therebetween. The A inverted A phase output 65 and the B—inverted B phase output 66 have a phase relationship of 90° therebetween.

Assume that the phase relationships of the phase outputs shown in FIG. 30A are shifted. At this time, when all the four phase outputs are shifted by the same angle in the same direction, the phase relationship between the A—inverted A phase output 65 and the B —inverted B phase output 66 maintains 90°, as shown in FIG. 30B.

When the phase angle between the A phase output 61 and the inverted A phase output 63 is shifted by the same angle in opposite directions, the phase angle of the A—inverted A phase output 65 is left unchanged, and the same applies to the B phase output 62, the inverted B phase output 64, and the B—inverted B phase output 65.

Most phase change states of phase outputs have the above-mentioned tendencies. At this time, as described above, the phase relationship between the A—inverted A phase output and the B—inverted B phase output is maintained to be 90°. For example, assume that the light-receiving means 5 is pivoted through the angle $\Delta_y$ about the y-axis in FIG. 28A. In other words, assume that the light-receiving means is pivoted through the angle $\Delta_y$ about an arbitrary point. At this time, even when the light-receiving means 5 is pivoted about any point, this pivotal movement can be replaced with the sum of rotations about almost the centers of the four photodiodes 41, 42, 43, and 44, and their parallel movements.

In the phase change states of the phases in parallel movements, since all the phases are shifted by the same angle, the phase relationship between the two phase signals, i.e., the A—inverted A phase output and the B—inverted B phase output as the final outputs is maintained to be almost 90°.

On the other hand, upon rotations about almost the centers of the four photodiodes 41 to 44, the A phase output and the inverted A phase output, and the B phase output and the inverted B phase outputs are shifted by the same angle in opposite directions, respectively. For this reason, the phase relationship between the two phase signals, i.e., the A—inverted A phase output and the B—inverted B phase output as the final outputs is maintained to be almost 90°.

The above-mentioned condition is satisfied when each phase waveform is not only a sine wave but also not a sine wave, i.e., its fundamental wave, and the same effect as described above can be obtained in this case.

FIG. 31A shows a case wherein the A phase output 61 has a waveform, which is asymmetrical with respect to a zero voltage in the y-direction, and hence, the interval between zero-crossing points is not constant. The zero-crossing point means an intersection between an output waveform from the encoder and a center voltage (0 V). The above-mentioned phenomenon occurs due to asymmetrical bright and dark levels of an upper brightness pattern of the light-receiving means 5 when the width ($D_1$) of each window of the main scale 2 is not precisely equal to ½ the pitch P. The aligning operation is performed based on zero-crossing points in aligning control of a movable portion. For this reason, if the zero-crossing points are not arranged at equal intervals, an aligning error occurs.

As shown in FIG. 31B, the inverted A phase output 63 is obtained by shifting the phase of the A phase output 61 by 180°, and is not obtained by merely inverting it. As a result, the A—inverted A phase output 65 has zero-crossing points arranged at equal intervals, and has a symmetrical waveform with respect to the y-direction, as shown in FIG. 31C.

FIG. 32 shows a case wherein the phase difference between the A phase output 61 and the inverted A phase output 63 is slightly shifted from 180°. In this case, the A—inverted A phase output 65 also has zero-crossing points arranged at equal intervals therebetween, and a symmetrical waveform with respect to the y-direction.

As described above, the encoder shown in FIG. 28 has many advantages. However, this encoder suffers from the following problem. That is, the output waveforms from the photodiodes change according to the distance between the main scale 2 and the light-receiving means 5.

If the A phase output and the inverted A phase output stably have predetermined waveforms and if the phase difference therebetween is shifted from 180°, the A—inverted A phase output as the difference between the two outputs have a different waveform from the two waveforms. For example, when triangular wave signals can be obtained from the A phase output and the inverted A phase output, if the phase difference therebetween is shifted from 180°, the waveform of the A—inverted A phase output does not become a triangular waveform accordingly. Thus, detection precision of the moving state of the main scale 2 is undesirably deteriorates.

SUMMARY OF THE INVENTION

It is a first object of the present invention to provide an encoder capable of precisely detecting an arbitrary position. In order to achieve the above object, according to an aspect of the present invention, an encoder includes a detection unit for detecting a displacement of a movable portion, a generator means for generating multiple phase periodic signals of three or more different phases, which signals change according to the displacement, a selection unit for selecting one of the multiple phase periodic signals, and an offsetting unit that provides a predetermined offset to the selected signal.

It is a second object of the present invention to provide an encoder capable of obtaining a sine wave signal having a good waveform. In order to achieve the above object, according to another aspect of the present invention, an encoder includes an irradiation unit radiating a light beam toward a scale on which a grating is formed along a relative displacement direction, and a displacement unit, having a light-receiving element for receiving light modulated by the grating, for obtaining relative displacement information between the light beam and the scale, wherein an optical window whose opening width changes in a direction intersecting the displacement direction is arranged in front of the light-receiving element.

Other objects and features of the present invention will become apparent from the following embodiments.

BRIEF DESCRIPTION OF THE DRAWINGS

FIG. 8 shows graphs for explaining the relationship between the light-receiving surface window shape of a light receiver shown in FIG. 5 and the light amount distribution on the surface of the light receiver;

FIG. 9 is a graph for explaining symmetry of the light amount distribution on the surface of the light-receiving means;

DESCRIPTION OF THE PREFERRED EMBODIMENTS

First Embodiment

Figure 1:
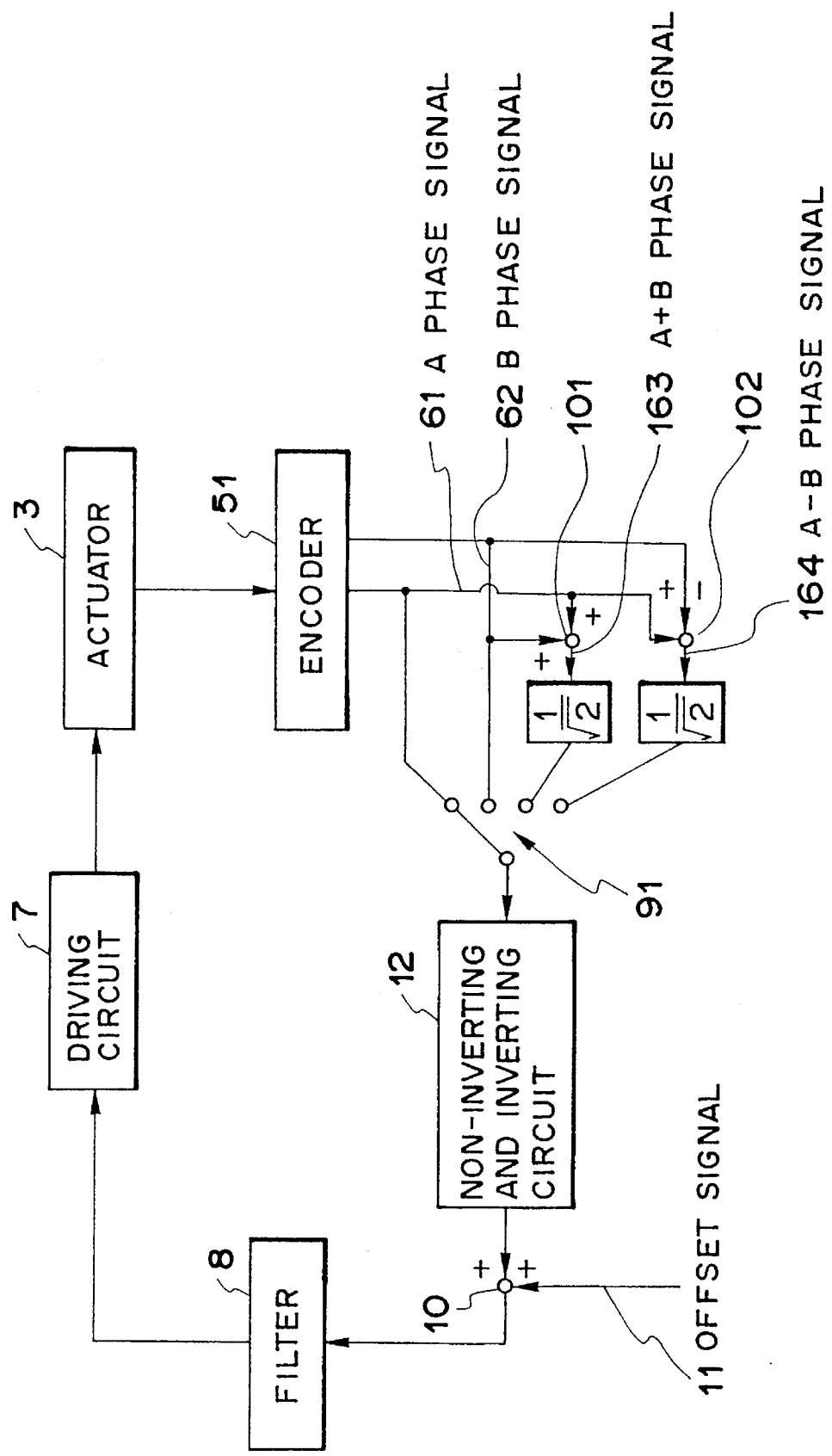
FIG. 1 is a block diagram showing a principal part of a signal control system of an embodiment.

FIG. 1 is a block diagram showing a principal part of a signal control system according to the first embodiment of the present invention. In this embodiment, two phase output signals 61 and 62 from an encoder 51 as a position detector are assumed to have sine waveforms. The encoder 51 comprises the following arrangement for outputting two phase signals. The encoder includes a linear type and a rotary type.

In FIG. 1, an actuator 3 for moving a movable portion (not shown) such as a head of a hard disk, or the like is controlled by a driving circuit 7. A compensation filter 8 is used in an aligning signal processing circuit of this embodiment. An A phase signal 61 and a B phase signal 62 (a phase difference therebetween is 90°) are output from the encoder 51, and an A+B phase signal 163 is obtained through an adder 101. An A−B phase signal 164 is obtained through a subtracter 102. An electronic switch 91 serves as a selection means for selecting one of the phase signals 61, 62, 163, and 164. A non-inverting and inverting circuit 12 non-inverts/inverts the output signal from the encoder 51 side. An offset signal 11 is added to the output signal from the encoder 51.

The A+B phase signal 163 is obtained by adding the A and B phase signals 61 and 62 in the adder 101, and then, multiplying the sum with $1/\sqrt{2}$ by, e.g., a resistor, so as to have the same amplitude as those of the A and B phase signals. The A−B phase signal is obtained by subtracting the B phase signal 62 from the A phase signal 61 in the subtracter 102, and then, multiplying the difference with $1/\sqrt{2}$ by, e.g., a resistor.

Figure 2:
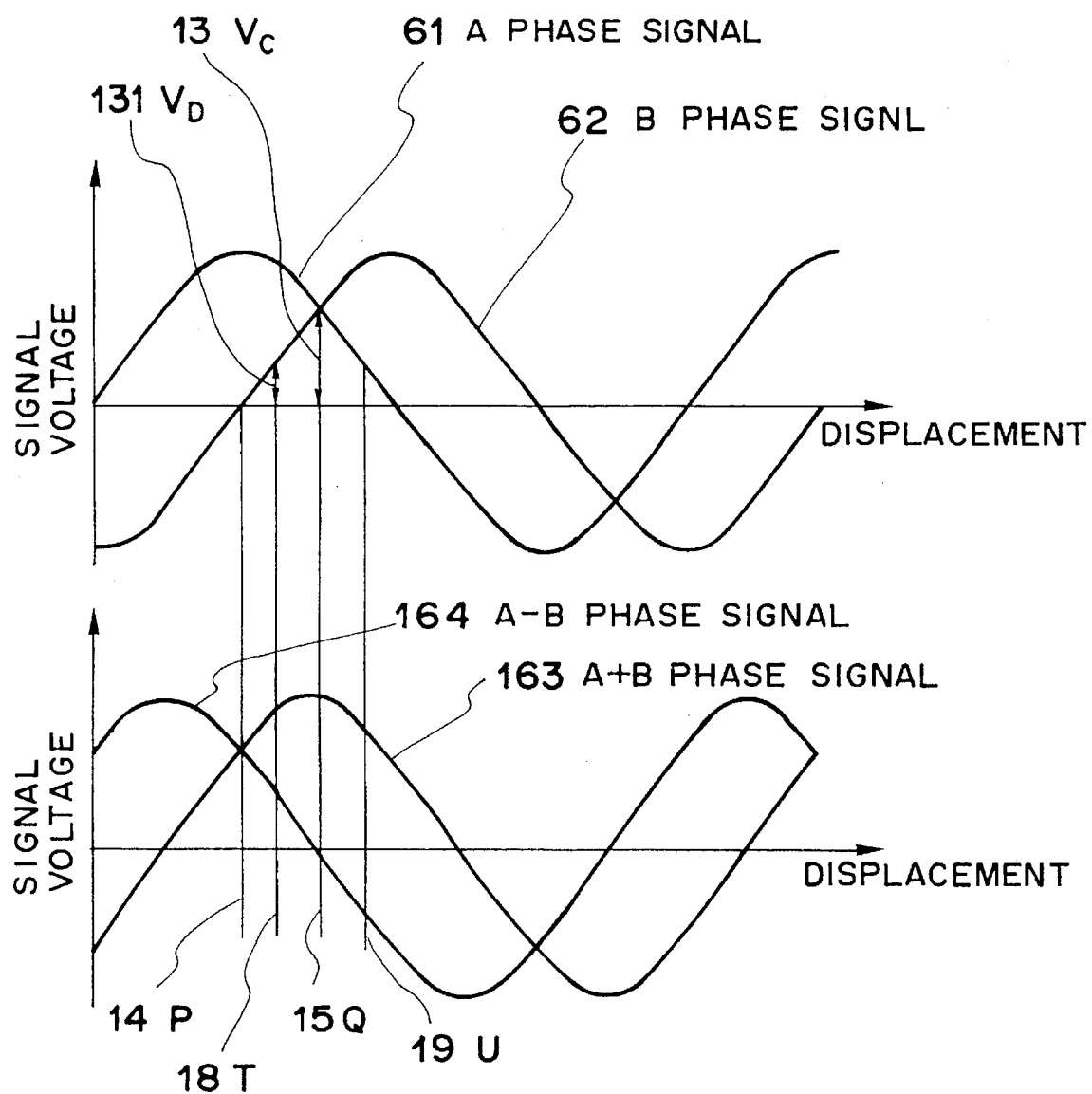
FIG. 2 is an explanatory view of output signals from the encoder shown in FIG. 1.

FIG. 2 shows the relationship among the A phase, B phase, A+B phase, and A−B phase signals when the movable portion is displaced by the actuator 3. The A+B phase signal 163 and the A−B phase signal 164 have a phase difference of 45° from the A phase signal, and the A+B phase signal 163 and the A−B phase signal 164 have a phase difference of 90° therebetween.

It will be explained below that an arbitrary aligning operation with high reliability and high precision can be performed using a total of four phase signals generated based on two phase signals, i.e., A and B phase signals.

Assume that the movable portion is aligned with a P point 14 in FIG. 2. It is also assumed that the movable portion is displaced from the P point 14 in the positive (right direction in FIG. 2). At this time, the offset signal 11 is zero, and the switch 91 is connected to the B phase signal 62 side.

The movable portion is moved to a T point 18 using the B phase signal 62. A negative voltage as the offset voltage 11 is increased from zero, and when the voltage reaches a signal voltage $-V_D$ (131), the movable portion is aligned with the T point 18. The output signal from the encoder 51 is switched to the A−B phase signal 164 by the switch 91, and the A−B phase 10 signal 164 is inverted by the non-inverting and inverting circuit 12. A signal voltage $+V_D$ is then output as the offset signal 11. Thus, the movable portion is aligned with the T point 18 by the A−B phase signal 164.

The aligning point is then moved to a U point 19 by the A—B phase signal and the offset signal 11. When the offset signal 11 is decreased from the signal voltage $+V_D$, the aligning point is moved from the T point 18 to a Q point 15. When the signal voltage reaches $-V_D$, the movable portion is aligned with the U point 19. When the aligning point is moved to the U point 19, the output signal is switched to the A phase signal 61 by the switch 91. The A phase signal 61 is inverted by the non-inverting and inverting circuit 12. The offset signal 11 is set to be a signal voltage $+V_D$. Thus, the movable portion can be aligned with the U point 19 by the A phase signal 61. Upon repetition of the above-mentioned operations, the movable portion can be continuously aligned with an arbitrary position.

Figure 16:
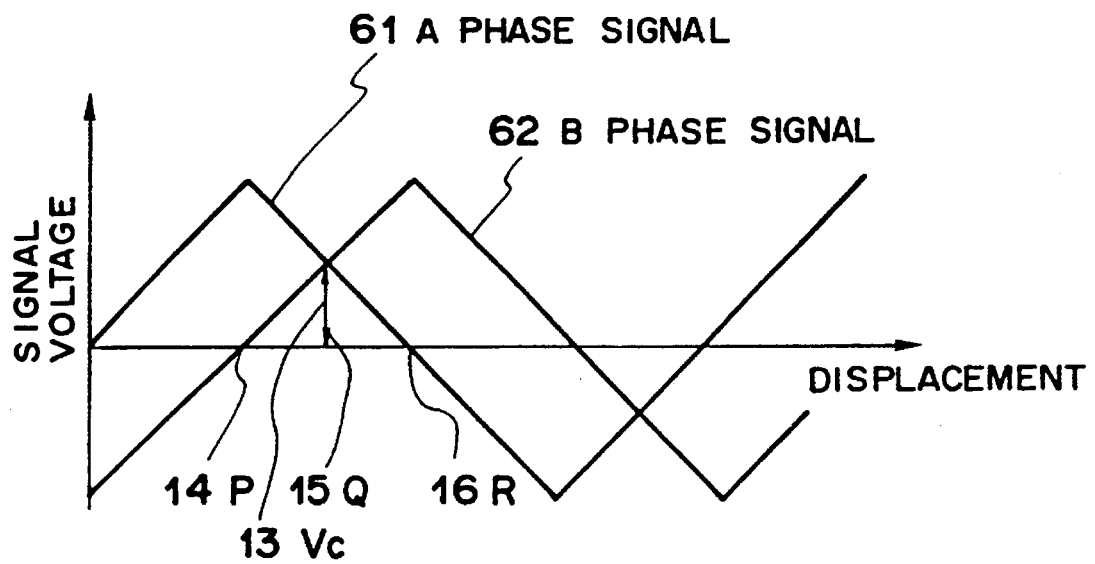
FIG. 16 is a graph for explaining output signals from the encoder shown in FIG. 15.
Figure 17:
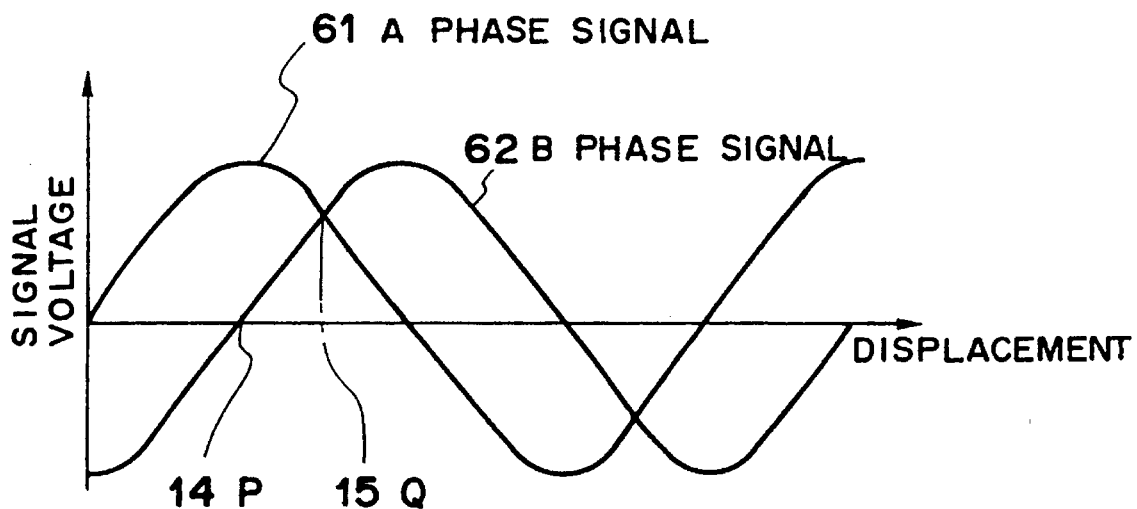
FIG. 17 is a graph for explaining output signals from the encoder shown in FIG. 15.
Figure 18:
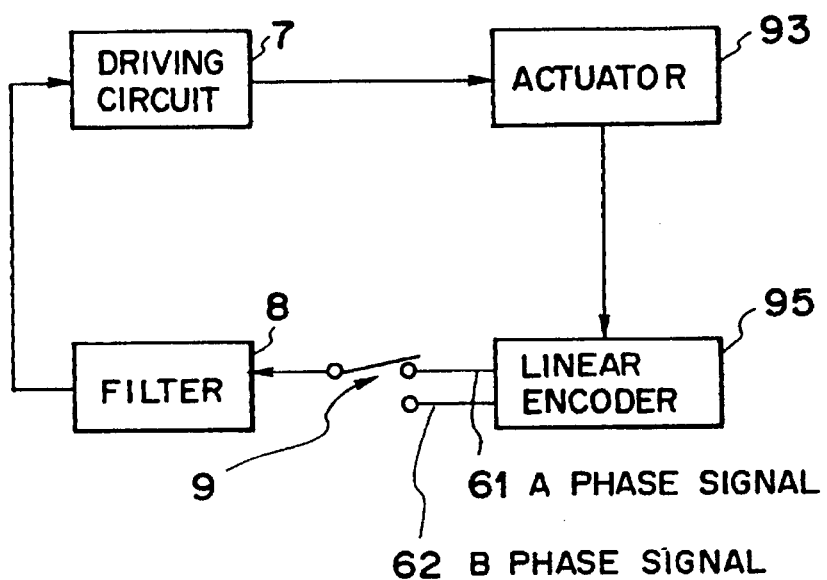
FIG. 18 is a schematic block diagram showing a control system of the aligning apparatus shown in FIG. 15.
Figure 19:
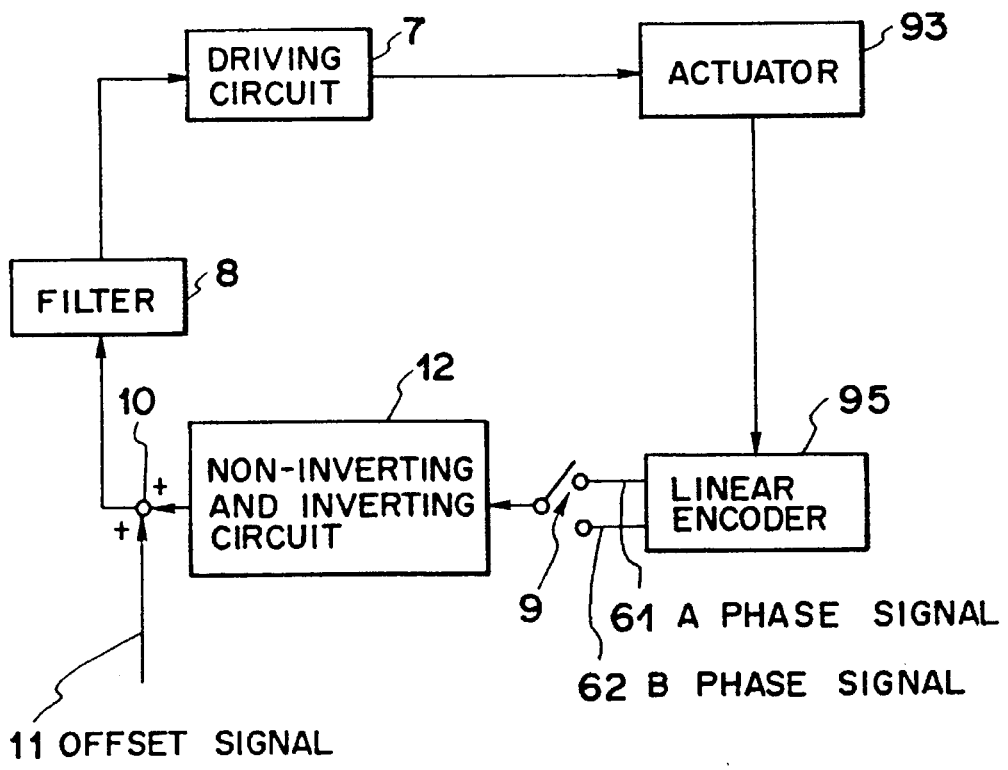
FIG. 19 is a schematic block diagram showing the control system of the aligning apparatus shown in FIG. 15.
Figure 20:
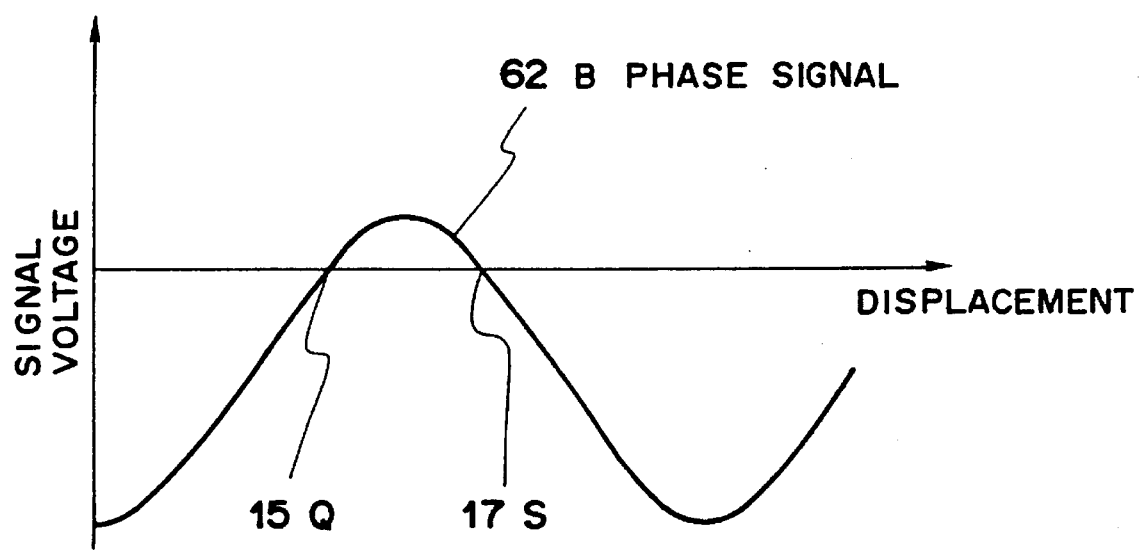
FIG. 20 is a graph for explaining signal processing by the control system shown in FIG. 19.
Figure 21:
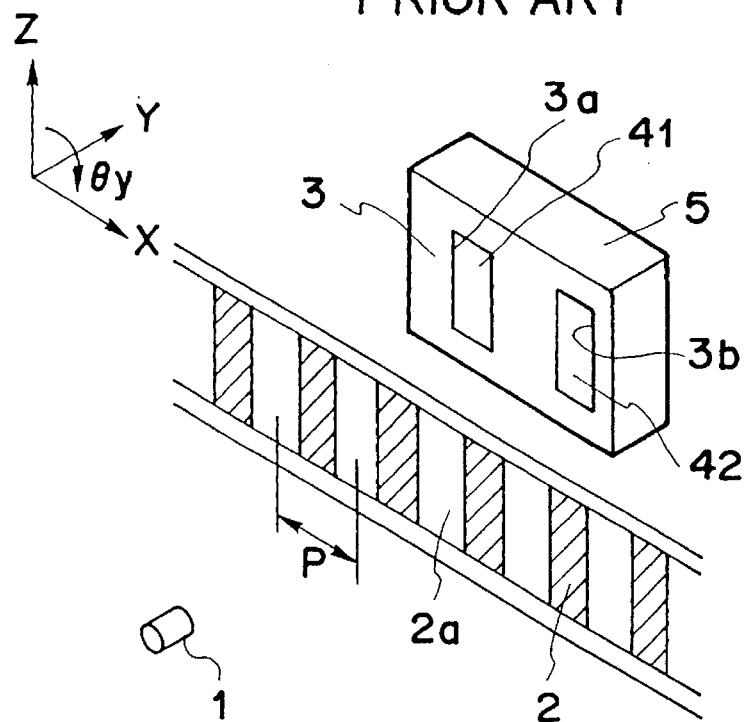
FIG. 21 is a schematic view showing a principal part of a conventional encoder.
Figure 22:
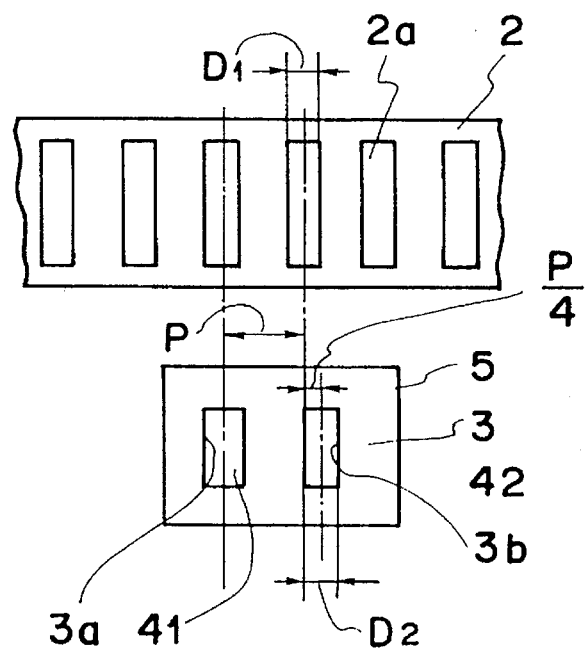
FIG. 22 is a partially enlarged explanatory view of FIG. 21.
Figure 23:
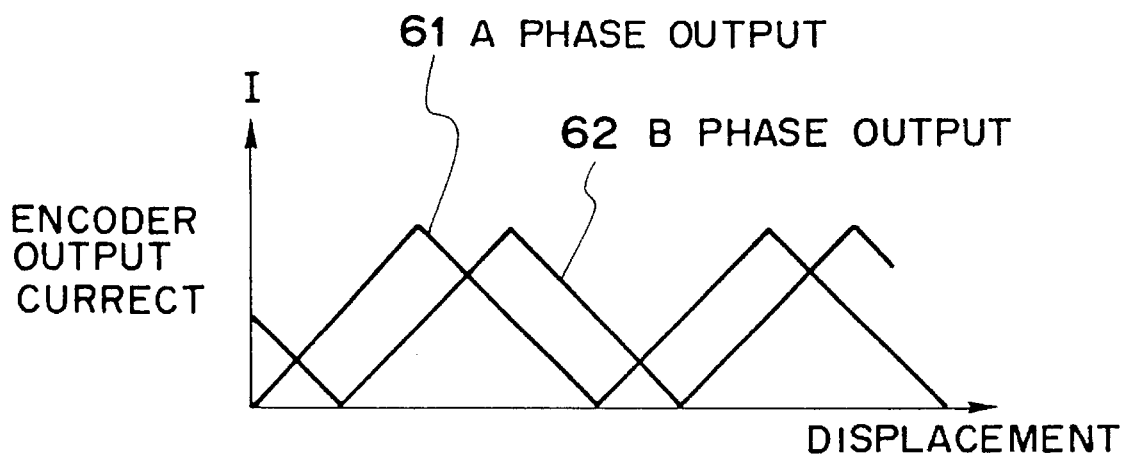
FIG. 23 is a graph for explaining output current waveforms obtained by a light receiver shown in FIG. 21.
Figure 24:
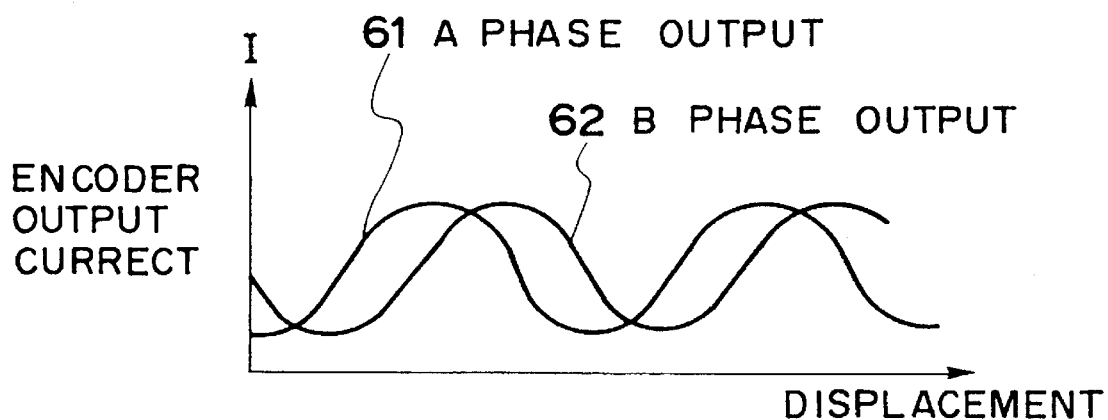
FIG. 24 is a graph for explaining output current waveforms obtained by the light receiver shown in FIG. 21.
Figure 25:
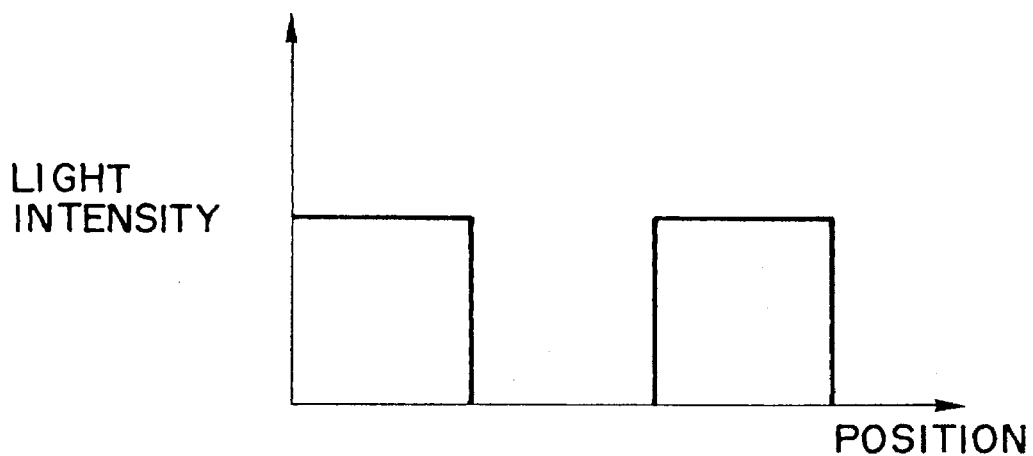
FIG. 25 is a graph for explaining the light amount distribution on the surface of the light receiver shown in FIG. 21.
Figure 26:
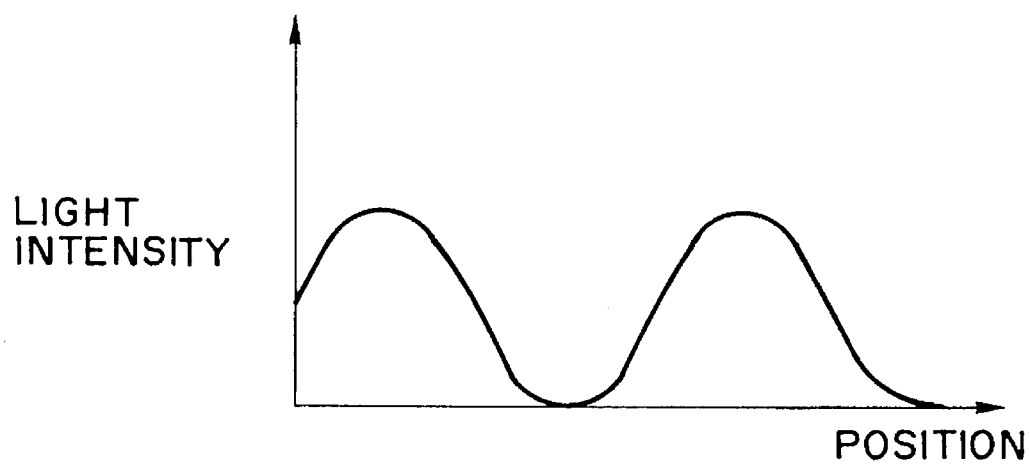
FIG. 26 is another graph for explaining the light amount distribution on the surface of the light receiver shown in FIG. 21.
Figure 27:
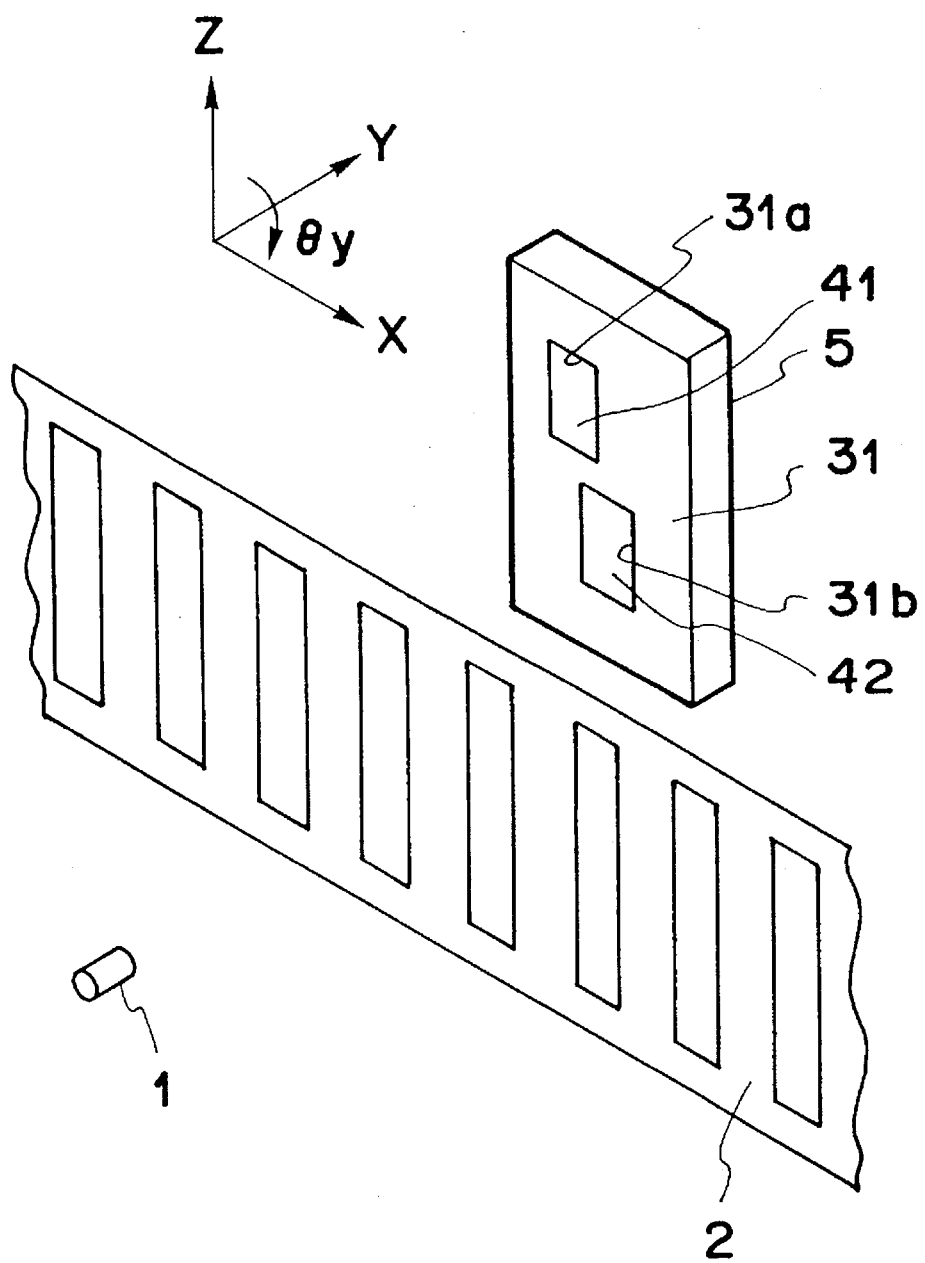
FIG. 27 is a schematic view showing a principal part of another conventional encoder.

As described above, the signal voltage of the offset signal 11 is changed between $-V_D$ and $+V_D$. The signal voltage $V_D$ (131) at this time is lower than the conventional signal voltage $V_c$ shown in FIG. 16, i.e., about ½ the voltage $V_c$. For this reason, only a portion approximate to a straight line of the output signal from the encoder can be used. At this time, a change in inclination of the encoder output at the phase switching point is decreased by about 10%, and is smaller than a change amount of about 30% in the conventional encoder. In addition, since a portion of the signal near the center thereof can be used, higher reliability than the prior art can be assured against, e.g., a disturbance.

In the above description, the movable portion is continuously moved using the phase signals 61, 62, 163, and 164 from the encoder 51. Alternatively, a seek operation of the movable portion to a position to be aligned can be performed by another method first, and thereafter, the movable portion can be aligned by the method of this embodiment.

In this embodiment, the four phase signal outputs consist of the two phase signals output from the encoder 51, and their sum and difference signals. Alternatively, an encoder having an arrangement to be described later may be used to initially obtain four phase signals having the relationship shown in FIG. 2.

In the above description, this embodiment is particularly effective when the output signal from the encoder 51 has a sine waveform. However, the same functions and effects can be obtained if the output signal has another waveform.

Second Embodiment

Figure 3:
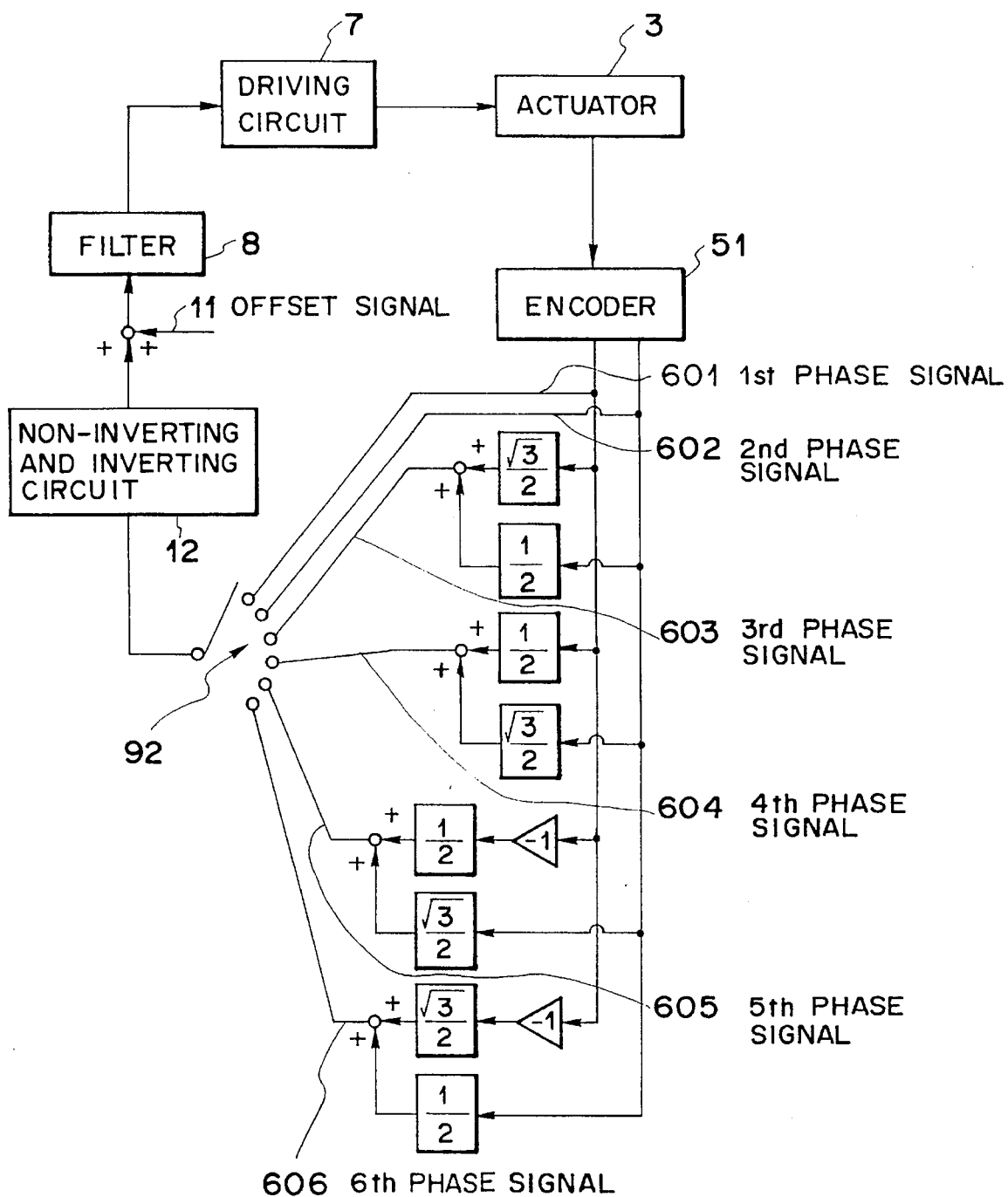
FIG. 3 is a block diagram showing a principal part of a signal control system of another embodiment.
Figure 4:
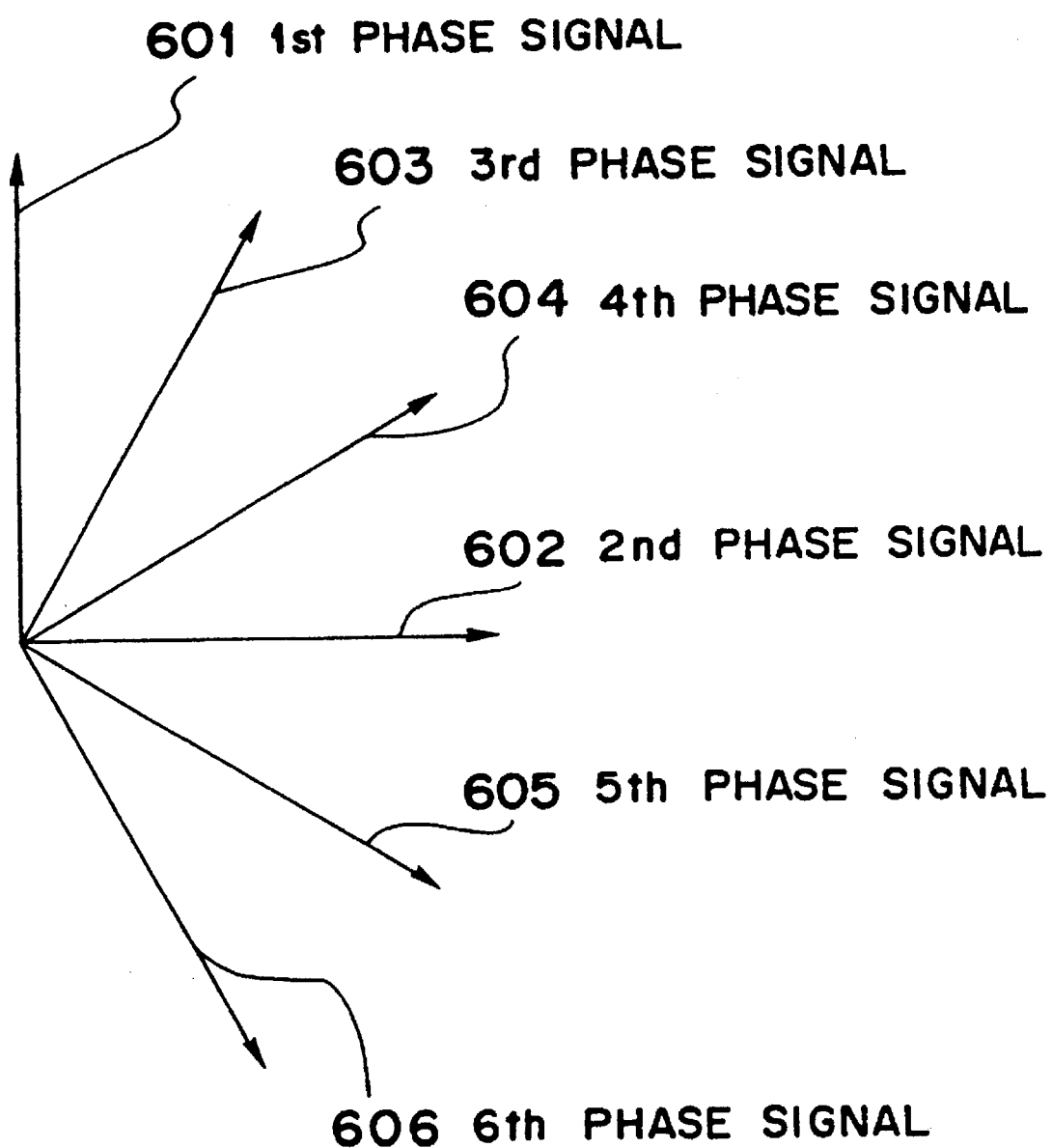
FIG. 4 is a vector diagram of output signals from the encoder shown in FIG. 3.

FIG. 3 is a schematic diagram of a signal control system according to the second embodiment of the present invention. FIG. 4 is a vector diagram of the output signals from an encoder shown in FIG. 3. The same reference numerals in FIG. 3 denote the same parts as in FIG. 1.

In this embodiment, an encoder 51 outputs an A phase signal 601 and a B phase signal 602 to have a phase difference of 90° therebetween according to a displacement of a movable portion like in the first embodiment. Assume that the output signals at that time have sine waveforms. Thus, as shown in FIG. 4, one sine wave can be expressed by a vector (also called a phaser) having a magnitude, and a phase with respect to a given reference.

In FIG. 4, the two output signals 601 and 602 are output from the encoder 51 in FIG. 1 of the first embodiment, and are assumed to be first and second phase signals. The two signals 601 and 602 have a phase difference of 90° therebetween. A third phase signal 603 is a sum of a product obtained by multiplying the first phase signal 601 with $\sqrt{3}/2$, and a product obtained by multiplying the second phase signal 602 with ½. A fourth phase signal 604 is a sum of a product obtained by multiplying the first phase signal 601 with ½, and a product obtained by multiplying the second phase signal 602 with $\sqrt{3}/2$. A fifth phase signal 605 is a sum of a product obtained by multiplying the first phase signal 601 with $-½$, and a product obtained by multiplying the second phase signal 602 with $\sqrt{3}/2$. A sixth phase signal 606 is a sum of a product obtained by multiplying the first phase signal 601 with $-\sqrt{3}/2$, and a product obtained by multiplying the second phase signal 602 with ½.

In this embodiment, a total of six phase signals are obtained based on the two phase signals 601 and 602. In FIG. 3, an electronic switch 92 serves as a selection means for selecting one of the six phase signals, i.e., the position signals 601, 602, 603, 604, 605, and 606.

The aligning method of the movable portion is the same as the first embodiment. More specifically, a position signal of a phase having a zero-crossing point closer to a position to be aligned is selected, and an offset signal 11 is added to the selected signal, thus forming the zero-crossing point of the position signal at that position.

In this embodiment with the above arrangement, multiple phase signals are obtained, and the aligning operation is performed with higher precision than in the first embodiment. Similarly, more signals may be obtained by synthesizing the first and second phase signals 601 and 602.

In this embodiment, as the output signals from the encoder, the two phase signals 601 and 602 having a phase difference of 90° therebetween are utilized. However, signals may have a phase difference other than 90°, and are not limited to two phase signals. For example, a plurality of different multiple phase signals may be synthesized from output signals having three or more phases.

Figure 15:
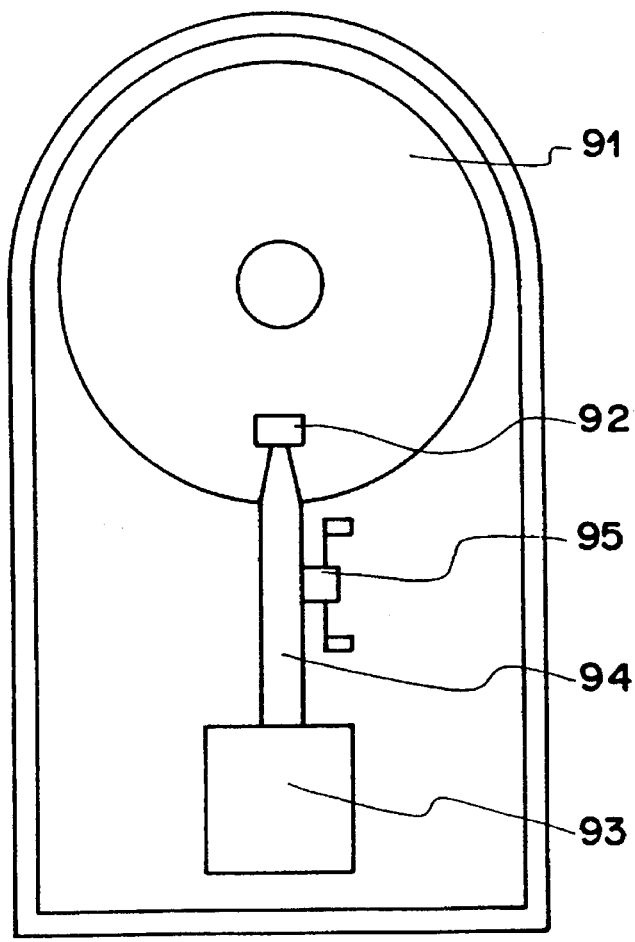
FIG. 15 is a schematic view of a principal part of a magnetic disk recording system having an aligning apparatus.

As described above, a plurality of signals having three or more different phases are synthesized from two or more output signals obtained from the encoder, and a signal selected from these multiple phase signals is used as an aligning signal. Thus, a movable portion can be stably aligned with an arbitrary point with high precision. This is very effective in, e.g., a field requiring precise movement such as head movement of a magnetic disk system, as shown in FIG. 15.

Third Embodiment

Figure 5:
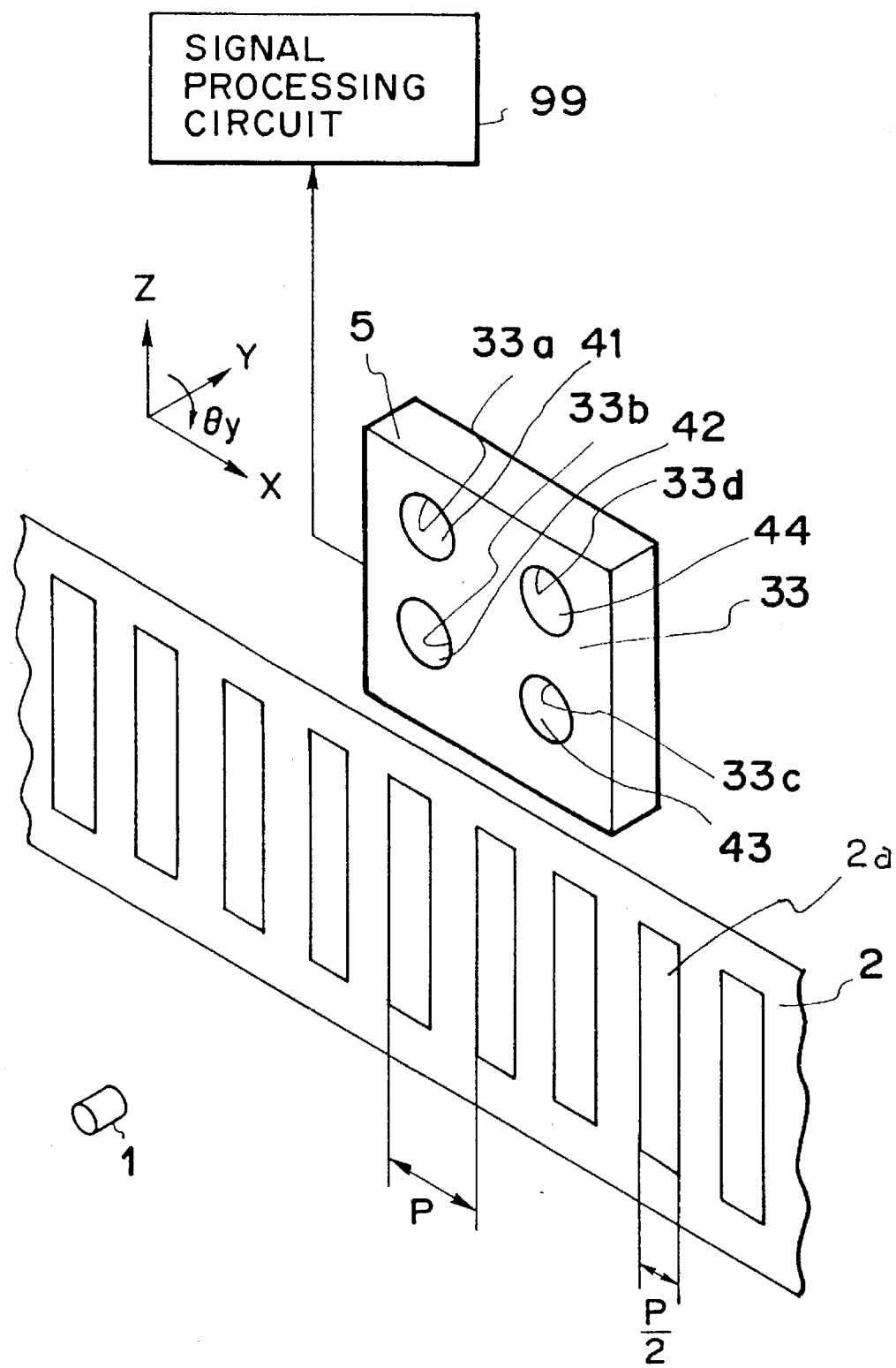
FIG. 5 is a schematic view showing a principal part of still another embodiment.

FIG. 5 is a schematic view showing a principal part of the third embodiment of the present invention. In FIG. 5, a light-emitting means 1 has a light source and a collimator lens. A main scale 2 is arranged in association with an object to be measured (not shown), and has a plurality of slit-like (rectangular) openings (windows) 2a at a pitch P in a moving direction x. A light receiver means 5 has four photodiodes 41, 42, 43, and 44. A mask 33 has openings (windows) 33a, 33b, 33c, and 33d having different widths in a direction (z-direction) perpendicular to the moving direction. Of the four photodiodes, the photodiode 41 is an A phase photodiode; 42, a B phase photodiode; 43, an inverted A phase photodiode; and 44, an inverted B phase photodiode. The outputs from these four photodiodes are connected to a signal processing circuit 99.

Figure 6A:
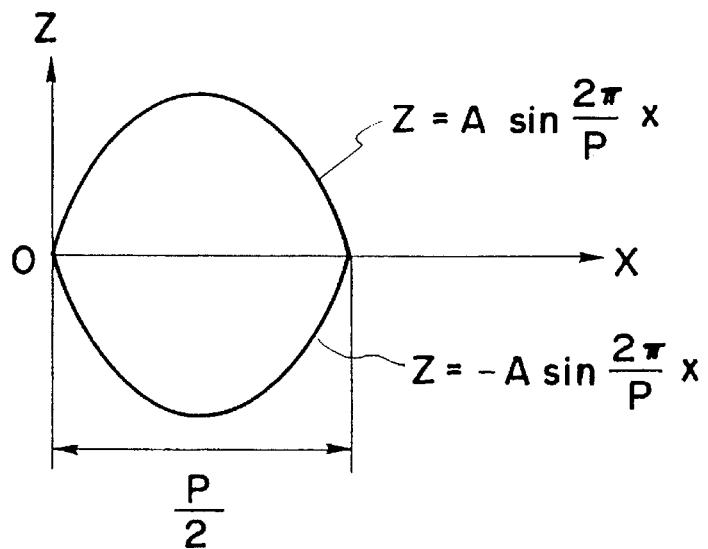
FIGS. 6A and 6B are partially enlarged explanatory views of FIG. 5.
Figure 6B:
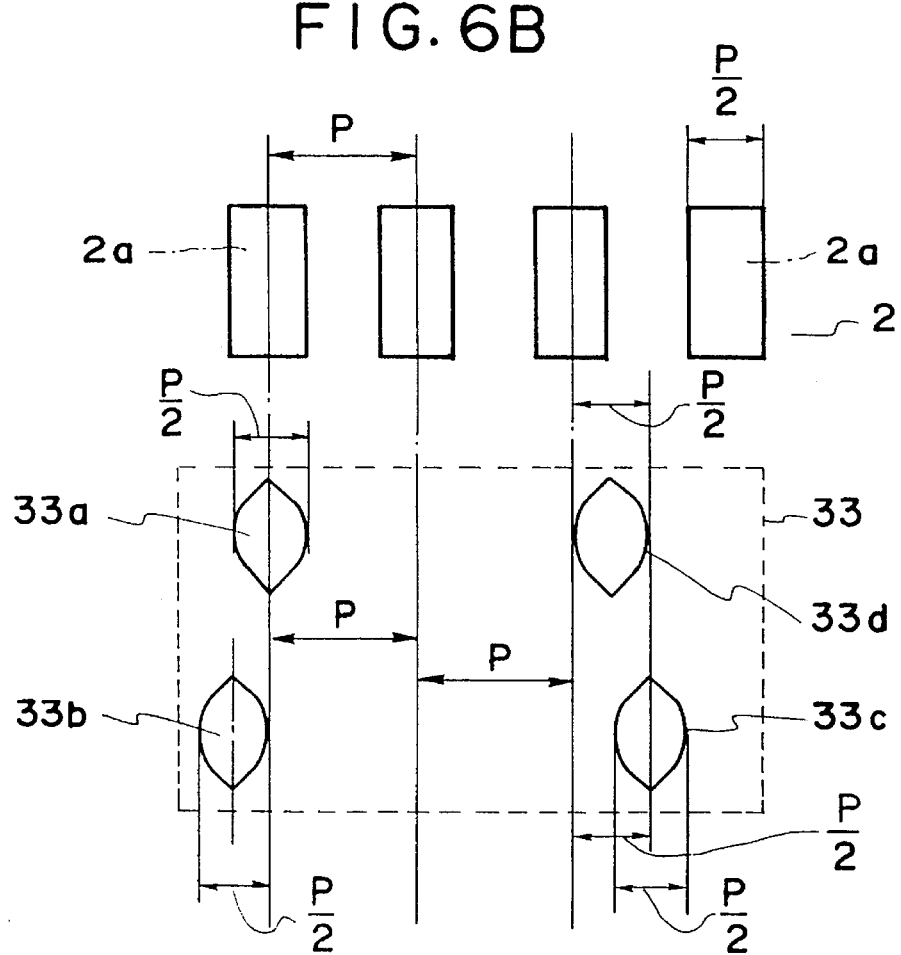

The openings (windows) on the mask 33 determine the light-receiving surface window shapes of the photodiodes (41, 42, 43, and 44) of the respective phases. The light-receiving surface window shape of the photodiode of each phase of this embodiment has a sine wave shape in the z-direction, as shown in FIG. 6A. The phase relationship between the openings 2a of the main scale 2, and the openings (windows) 33a to 33d of the mask 33 is as shown in FIG. 6B.

If the coordinate system shown in FIG. 5 is assumed, the light-receiving surface window shape of the window for one phase of the mask 33 consists of curves respectively given by:

$$Z = K\sin\left(\frac{2\pi}{P} x\right) \text{ and } Z = -K\sin\left(\frac{2\pi}{P} x\right) \text{ for } x = 0 \text{ to } \frac{P}{2}$$

(P is the pitch of the windows 2a of the scale 2)

Figure 7A:
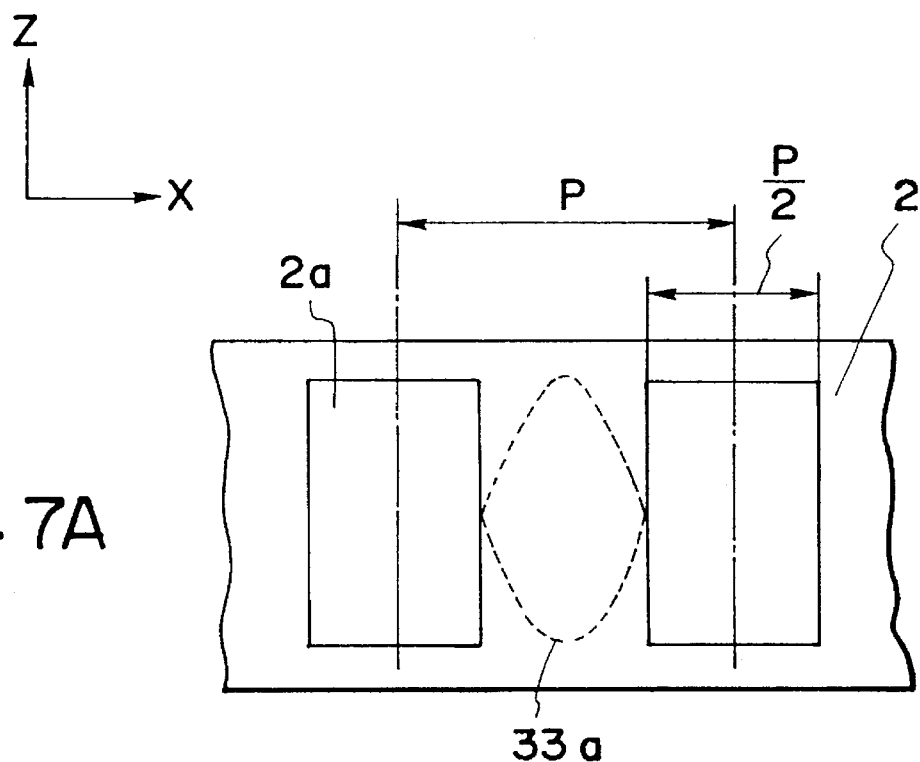
FIGS. 7A to 7C are explanatory views of the detection principle of FIG. 5.
Figure 7B:
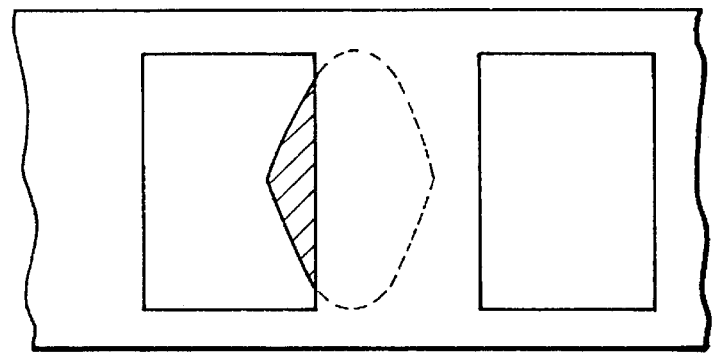
Figure 7C:
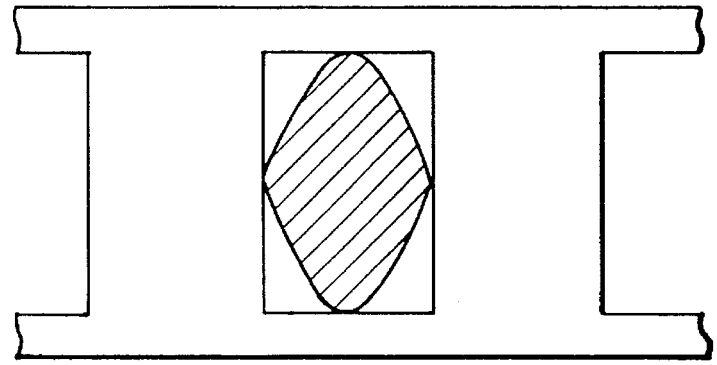

It will be explained below that the output waveforms of the respective phases become sine waves when the light-receiving surface window shape of this embodiment is used. FIGS. 7A to 7C are explanatory views showing the positional relationship between one opening (window) 33a of the mask 33 and the windows 2a of the main scale 2 when a given photodiode 41 receives light. The position of the main scale 2 relative to the window 33a is displaced in the x-direction. Assume that a light beam is radiated from the front side of the drawing surface, and is a collimated beam. In FIGS. 7A to 7C, a light-shielded portion of the window 33a is indicated by a dotted curve, and an irradiated portion thereof is indicated by hatching. If the intensity of light to be radiated is uniform, an output current I from the photodiode upon reception of light through this window is proportional to the area of the hatched portion. The relationship between a relative displacement x and an output current i from the photodiode is given by:

$$i(x) = I_0 \int_0^x ds \sin\left(\frac{2\pi}{P} s\right) \quad (1)$$
$$= I_0 \frac{P}{2\pi}\left(1 - \cos\left(\frac{2\pi}{P} x\right)\right)$$

where $I_0$ is a proportionality constant, S is an intermediate variable, and P is the pitch of the windows 2a of the main scale 2. When x=P/2, the positional relationship shown in FIG. 7C is attained. Using equation (1), a displacement from FIG. 7A to ½ the pitch P of the windows of the main scale 2 can be calculated. The following half pitch displacement is given by:

$$i = I_0 \frac{P}{2\pi}\left(2 - 1 + \cos\left(\frac{2\pi}{P} x + \pi\right)\right) \quad (2)$$
$$= I_0 \frac{P}{2\pi}\left(1 - \cos\left(\frac{2\pi}{P} x\right)\right)$$

That is, the following half pitch displacement is the same as that given by equation (1).

More specifically, the relationship between the displacement of the main scale 2 and the output current from the photodiode is given by equation (1). In this manner, when the light-receiving surface window shape of the photodiode has a sine wave shape, the output current from the photodiode of each phase with respect to the displacement is expressed by a sine wave.

The above description is made under an assumption that the light beam from the light-emitting means 1 is a collimated beam, i.e., the brightness pattern on the surface of the light-receiving means 5 is a perfect copy of the main scale 2, and the width ($D_1$) of each window 2a of the main scale 2 is ½ the pitch P of the windows 2a.

A general case will be explained below. The brightness (light intensity) distribution along the x-axis of the brightness pattern on the surface of the light-receiving means 5 is represented by f(x). f(x) can be expanded into a Fourier series as follows since it is a periodic function (the light intensity distribution is assumed to be uniform in the z-direction).

$$f(x) = \sum_{n=-\infty}^{\infty} C_n e^{inKx} \qquad (3)$$

where: i is the imaginary unit;

$n = -\infty, \ldots, -1, 0, 1, 2, \ldots, \infty$;

$C_n$ is a complex number;

K is the spatial frequency at $2\pi/P$;

P is the pitch of the windows of the main scale 2; and $C_n = C_{-n}*$ ($C^*$ is a conjugate complex number of C).

The relationship between the relative displacement between the main scale 2 and the light-receiving means 5, and the output current from the photodiode is calculated based on the light intensity distribution f(x) in the x-direction of a light beam on the surface of the light-receiving means 5, and the light-receiving surface window shape of the photodiode. The window width with respect to the x-direction of the light-receiving surface window shape of the photodiode, i.e., a width Dz in the z-direction is given by:

$B \sin(2\pi/P) \times$ (for x=0 to P/2, otherwise 0)

FIG. 8 shows the window width Dz at this time.

Furthermore, assume that the light intensity distribution f(x) is moving at a velocity v in the positive direction of x along with an elapse of time t. In this case, f(x) can be rewritten as f(x−vt). Then, a light current I(t) from the photodiode based on these parameters is given by the following equations. Note that $I_0$ is a constant. A condition for which the light current I(t) can have a sine wave is obtained as:

$$\begin{aligned}
I(t) &= I_0 \int_0^{\frac{P}{2}} dx \sin\left(\frac{2\pi}{P}x\right) f(x-vt) \\
&= I_0 \int_0^{\frac{P}{2}} dx \frac{e^{i\frac{2\pi}{P}x} - e^{-i\frac{2\pi}{P}x}}{2i} \sum_{n=-\infty}^{+\infty} C_n e^{in\frac{2\pi}{P}(x-vt)}
\end{aligned} \qquad (4)$$

if $K = \frac{2\pi}{P}$,

Then, $I(t) = \frac{I_0}{2i} \sum_{n=-\infty}^{+\infty} C_n \int_0^{\frac{P}{2}} dx [e^{iKx+inK(x-vt)} - e^{-iKx+inK(x-vt)}]$ $= \frac{I_0}{2i} \sum_{n=-\infty}^{+\infty} C_n \int_0^{\frac{P}{2}} dx [e^{iKx(1+n)} e^{-inKvt} - e^{iKx(-1+n)} e^{-inKvt}]$ $= \frac{I_0}{2i} \sum_{n=-\infty}^{+\infty} C_n e^{-inKvt} \int_0^{\frac{P}{2}} dx [e^{iKx(1+n)} - e^{iKx(-1+n)}]$ $= \frac{I_0}{2i} \sum_{n=-\infty}^{+\infty} C_n e^{-inKvt} \cdot \begin{cases} \left[\frac{e^{iKx(1+n)}}{iK(1+n)}\right]_0^{\frac{P}{2}} - \left[\frac{e^{iKx(-1+n)}}{iK(-1+n)}\right]_0^{\frac{P}{2}} \\ \quad (\text{when } n \neq 1, -1) \\ \frac{P}{2} - \left[\frac{e^{iKx(-2)}}{iK(-2)}\right]_0^{\frac{P}{2}} \\ \quad (\text{when } n = -1) \\ \left[\frac{e^{iKx(2)}}{iK(2)}\right]_0^{\frac{P}{2}} - \frac{P}{2} \\ \quad (\text{when } n = 1) \end{cases}$ $$= \frac{I_0}{2i} \sum_{n=-\infty}^{+\infty} C_n e^{-inKvt} \cdot \begin{cases} 0 & \text{(when } n \neq 1, -1 \text{ and} \\ & n \text{ is an odd number)} \\ \frac{-2}{iK(1+n)} - \frac{-2}{iK(-1+n)} \\ & (n \text{ is an even number and 0)} \\ \frac{P}{2} & \\ & (n = -1) \\ -\frac{P}{2} & \\ & (n = 1) \end{cases}$$

As described above, from equation (4), if the Fourier expansion component (equation (3)) of the light intensity distribution f(x) does not include harmonics of even orders (n is an even number) and (can include n=0), the output current waveform from the photodiode becomes a sine wave having only n=1 (also including n=0 as a DC component).

More specifically, if the Fourier component of the light intensity distribution f(x) on the surface of the light-receiving means 5 does not include harmonics of even orders (n is an even number), when the main scale 2 is moved relative to the light-receiving means 5 in the x-direction at a velocity v, the output current waveform I(t) from the photodiode becomes a sine wave having a pattern of sin(Kvt). This sine wave represents a change for one period when the relative displacement between the main scale 2 and the light-receiving means 5 is P, i.e., one period. That is, even if f(x) includes any allowable harmonics, i.e., harmonics of odd orders, the output waveform from the photodiode can become a sine wave.

A case will be described below wherein the Fourier component of f(x) does not include harmonics of even orders. For example, a case will be exemplified below wherein upper and lower waveforms with respect to the center of the waveform of f(x) are equal to each other, and have symmetrical patterns, as shown in FIG. 9.

As shown in FIG. 9, the positive and negative waveforms are equal to each other with respect to the x-axis. In addition, the positive waveform is symmetrical about a center line 101, and the negative waveform is symmetrical about a center line 102. In this case, f(x) can be expressed by the following Fourier series:

$$f(x) = C_0 + C_1 \sin\left(\frac{2\pi}{P} x\right) + C_3 \sin\left(3 \frac{2\pi}{P} x\right) + C_5 \sin\left(5 \frac{2\pi}{P} x\right) + \ldots$$

where $C_0, C_1, C_3, C_5, \ldots$ are real numbers.

More specifically, since the waveform includes only harmonics of odd orders, the output current waveform from the photodiode becomes a sine wave according to this f(x). Such f(x) can be obtained by properly selecting the window width $D_1$ with respect to the pitch P of the windows of the main scale 2. We experimentally confirmed that the window width $D_1=P/2$ was preferable. When the window width is selected in this manner, the symmetricity of f(x) does not largely change according to the distance between the main scale 2 and the light-receiving means 5. Even if the above-mentioned nature of f(x) are not perfectly satisfied, a waveform approximate to a sine wave can be stably obtained as an output current from the photodiode.

When the sine waves are obtained as the output current signals from the photodiodes 41 to 44 shown in FIG. 5, the sum of sine waves having the same frequency can also be a sine wave. Therefore, both the A—inverted A phase output, and the B—inverted B phase output can be sine waves.

Figure 29:
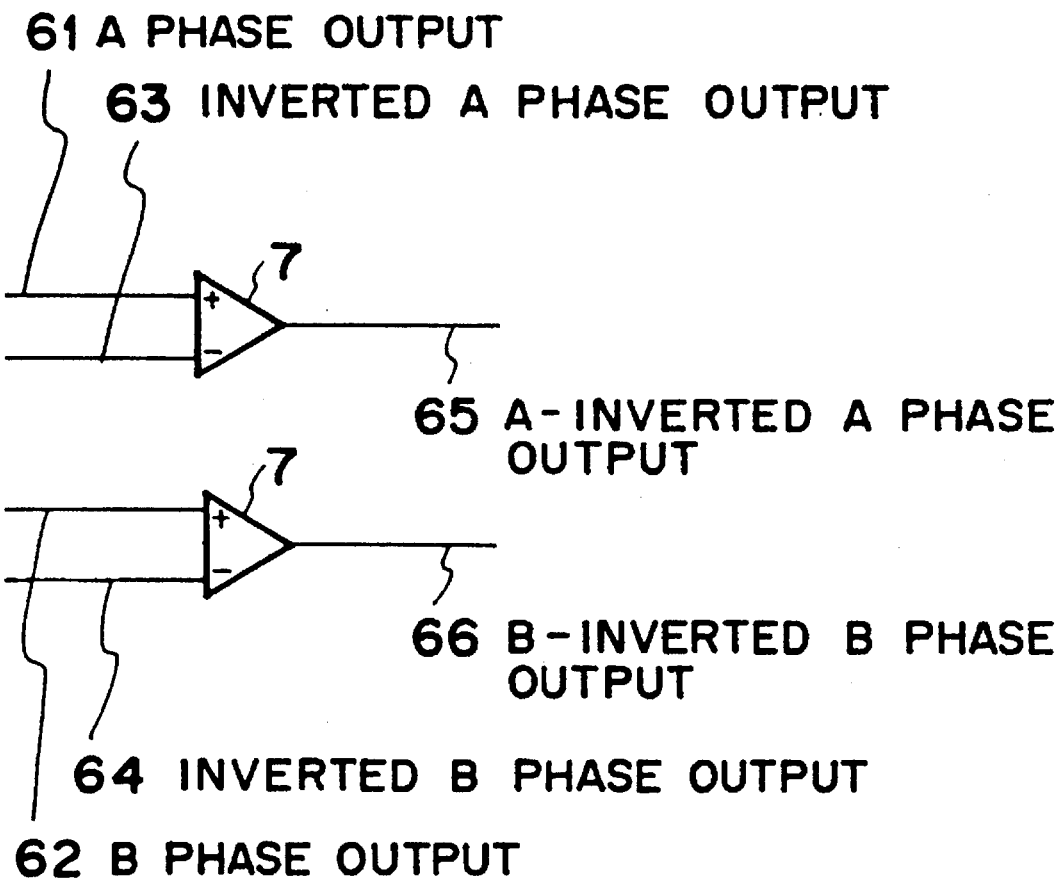
FIG. 29 is a circuit diagram for explaining a processing circuit for output signals from the light receiver.
Figure 30A:
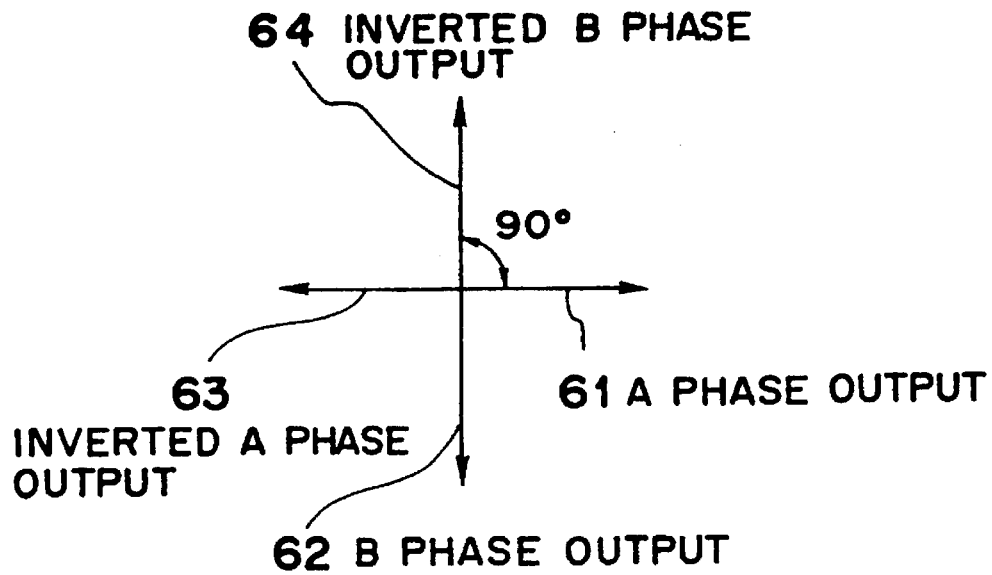
FIGS. 30A and 30B are vector diagrams when output signals are assumed to be sine waves.
Figure 30B:
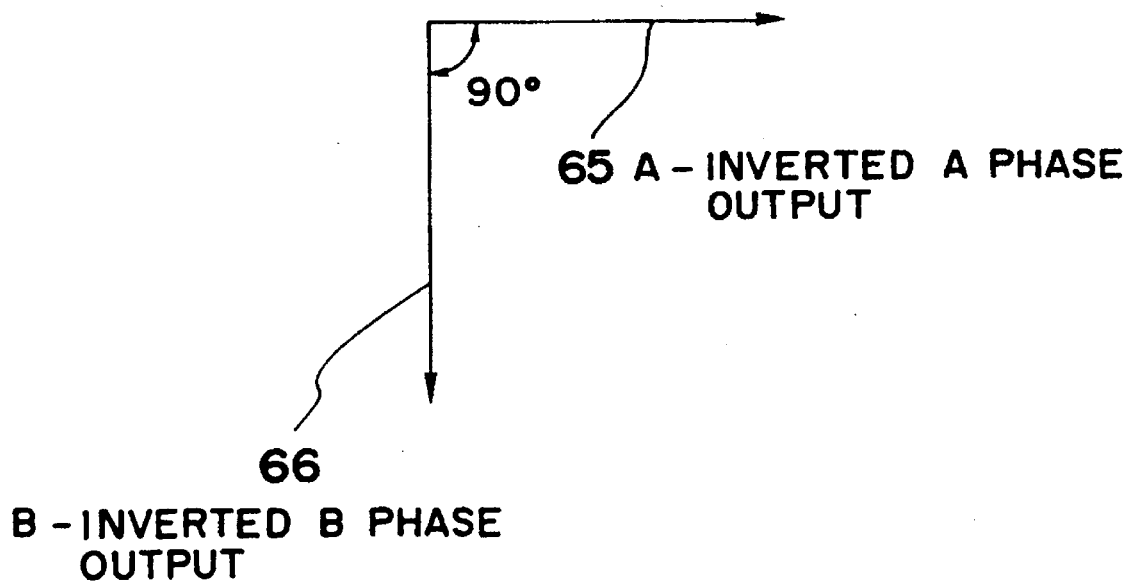
Figure 31A:
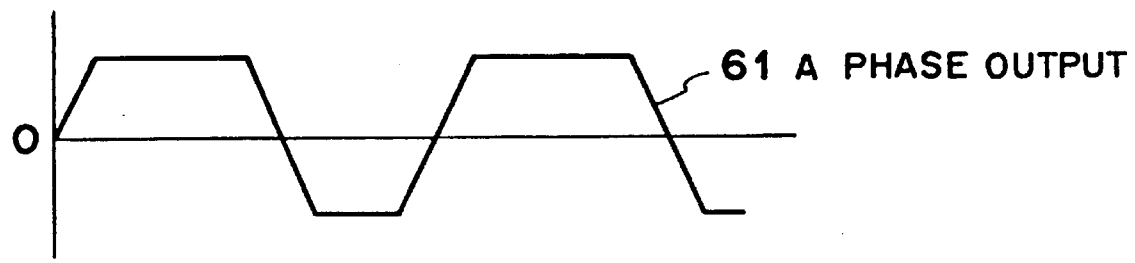
FIGS. 31A to 31C are charts for explaining differential output signals.
Figure 31B:
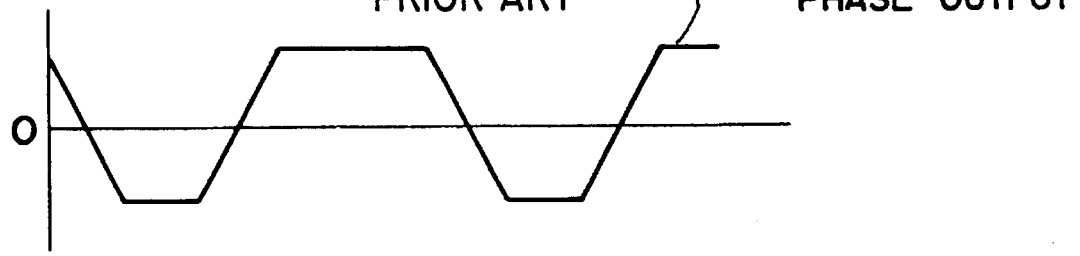
Figure 31C:
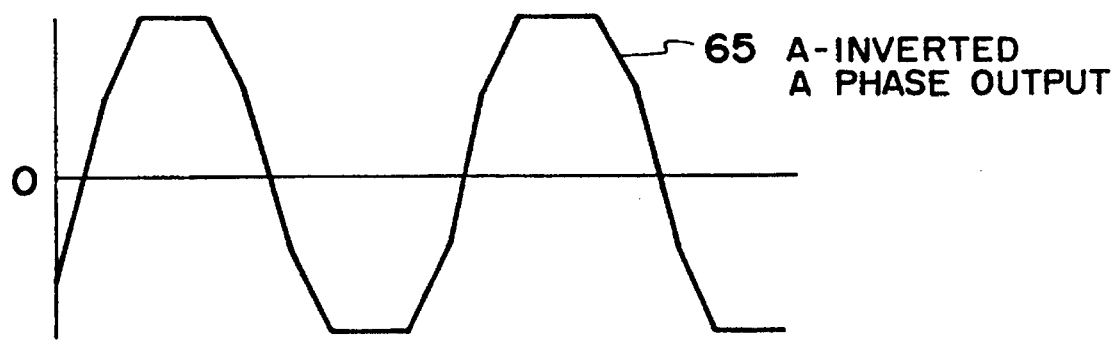
Figure 32:
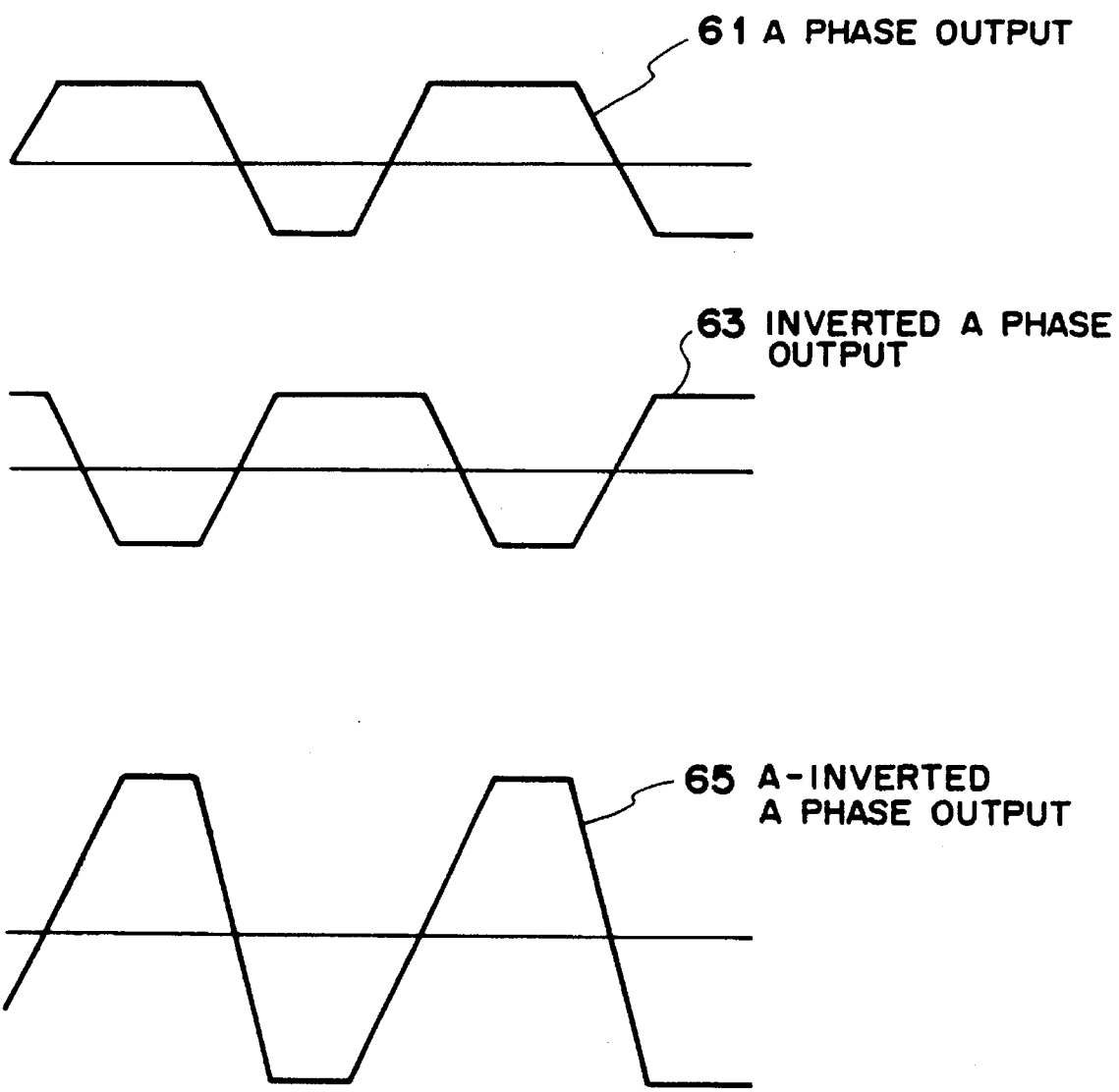
FIG. 32 is another chart for explaining the differential output signals.

As described above, when the distance between the main scale 2 and the light-receiving means 5 is slightly changed, the output current waveforms from the photodiodes can maintain sine wave patterns. These sine wave signals are finally differentially amplified by a circuit shown in FIG. 29 included in the signal processing circuit 99. For this reason, the two phase outputs, i.e., the A—inverted A phase output 65 and the B—inverted B phase output 66 as the final outputs, are substantially immune to various disturbances. Furthermore, since the outputs from the photodiodes can maintain sine waveforms, the A—inverted A phase output 65 and the B—inverted B phase output 66 as their final outputs can be stable even with mounting precision that may otherwise deteriorate the waveforms and the phase relationship.

The detailed experimental results of this embodiment will be described below.

Figure 10:
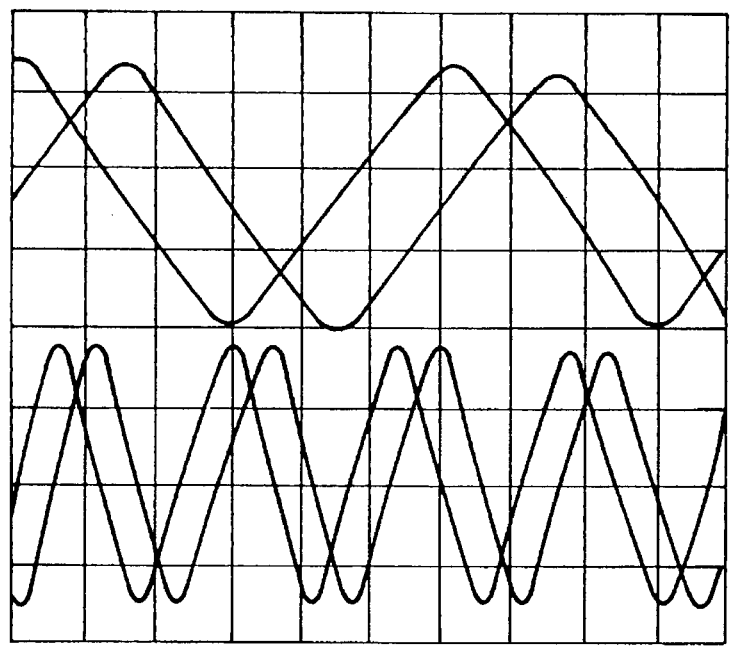
FIG. 10 is a chart for explaining signal waveforms obtained from the light receiver.
Figure 11:
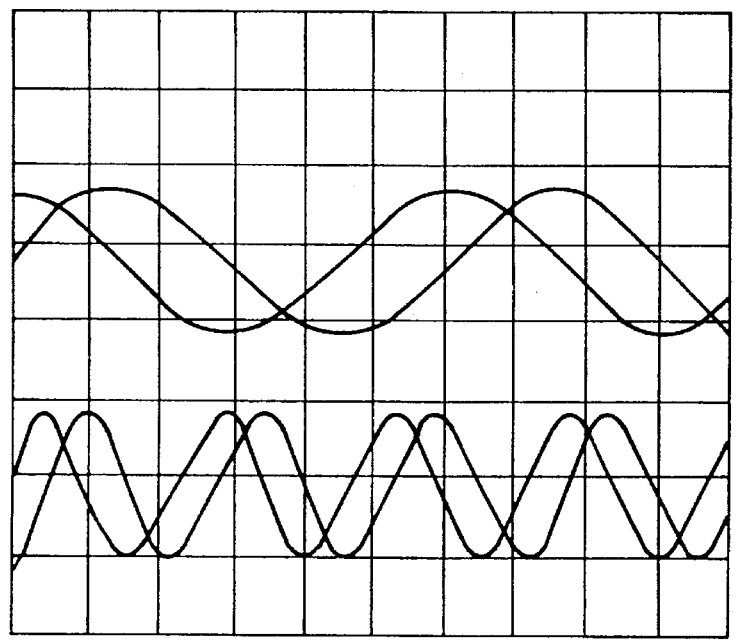
FIG. 11 is another chart for explaining signal waveforms obtained from the light receiver.
Figure 12:
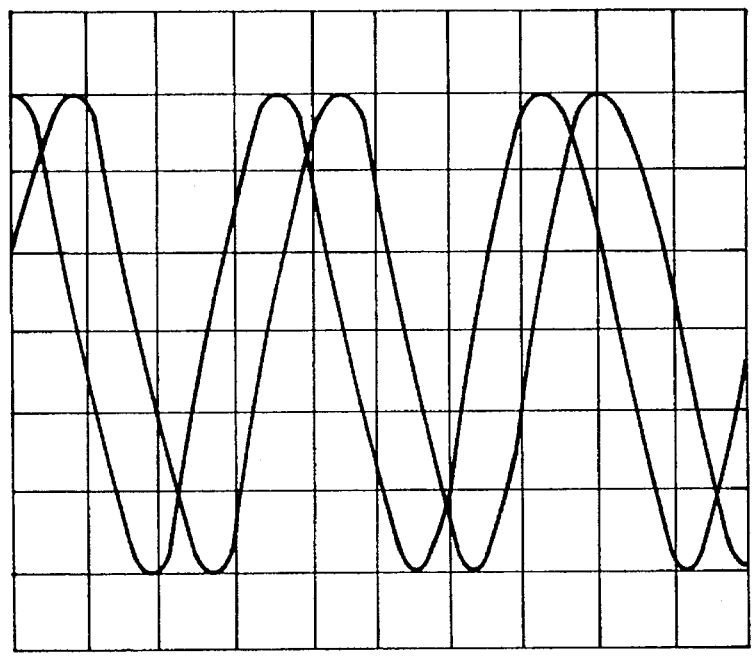
FIG. 12 is still another chart for explaining signal waveforms obtained from the light receiver.
Figure 13:
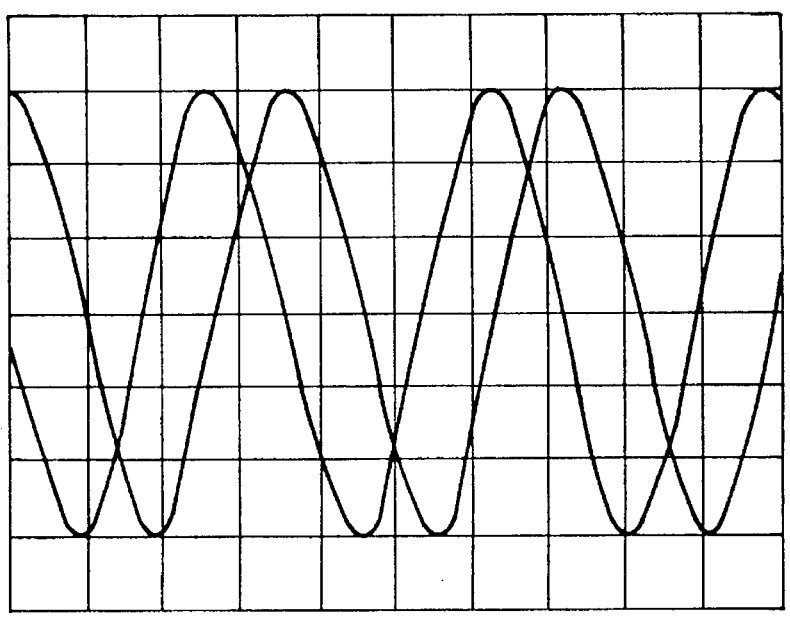
FIG. 13 is yet another chart for explaining signal waveforms obtained from the light receiver.
Figure 28A:
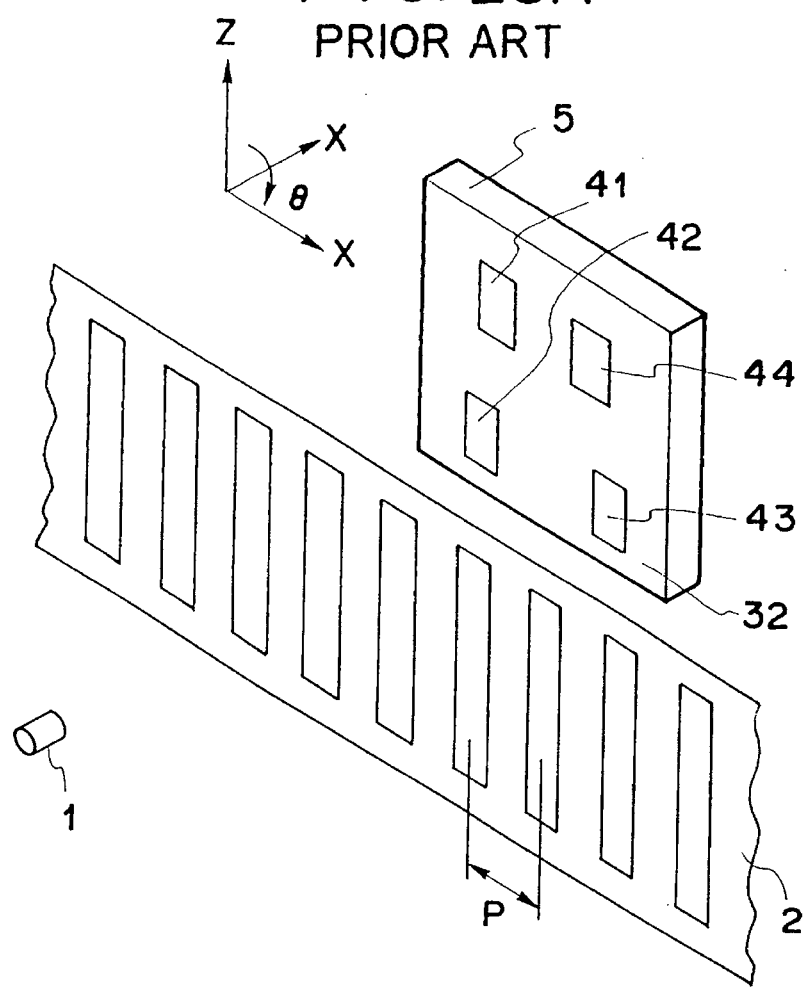
FIGS. 28A and 28B are schematic views showing a principal part of still another conventional encoder.
Figure 28B:
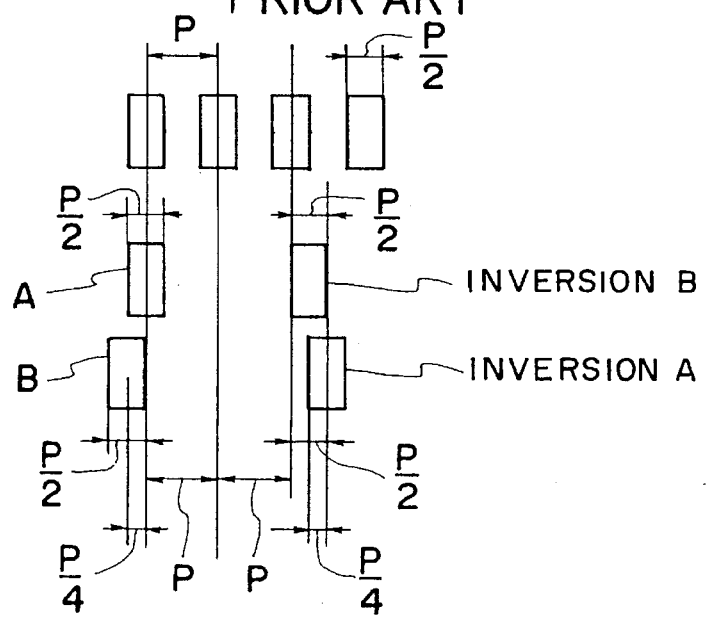

FIGS. 10 and 11 show output waveforms obtained when a main scale 2 having openings at the pitch P=200 μm is combined with a light-receiving means 5 whose mask has openings each having a rectangular light-receiving surface window shape in FIG. 28. FIGS. 10 and 11 show two phase outputs. A difference between upper and lower curves in FIGS. 10 and 11 is only in their time bases. FIG. 10 shows a case wherein the distance between the main scale 2 and the light-receiving means 5 is substantially 0, and FIG. 11 shows a case wherein the distance is 0.3 mm. In FIGS. 10 and 11, waveforms are considerably different from each other depending on the distances. In contrast to this, FIGS. 12 and 13 are output waveform charts obtained according to the embodiment of the present invention. FIG. 12 shows a case wherein the distance is substantially 0, and FIG. 13 shows a case wherein the distance is 0.8 mm. As shown in FIGS. 12 and 13, the waveforms of the two cases are substantially the same. Differences in output waveform charts of FIGS. 10, 11, 12, and 13 depend on only differences in light-receiving surface window shape of the photodiode.

As described above, when the light-receiving surface window shape of the light-receiving means is defined by a sine wave pattern, a stable sine wave can be obtained without requiring high mounting precision of an encoder to an object to be controlled. In particular, an encoder, which can obtain a stable sine wave irrespective of a change in distance between the main scale 2 and the light-receiving means 5, and can obtain high-precision displacement information, can be realized.

Figure 14:
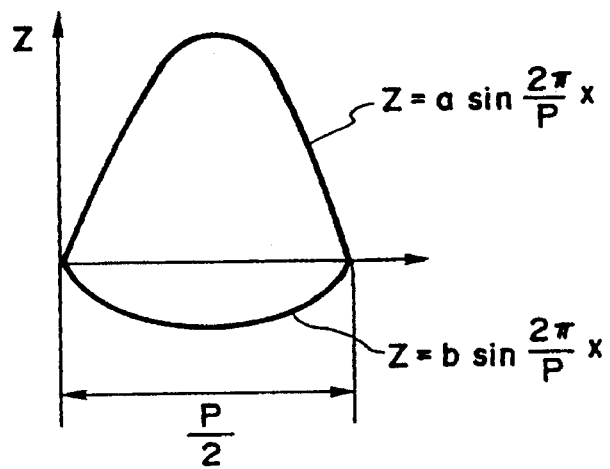
FIG. 14 is an explanatory view of another embodiment of a light receiving window shape according to the present invention.

In the description of the above embodiment, the photodiode has the light-receiving surface window shape shown in FIG. 6A. However, the light-receiving surface window shape of the present invention is not limited to this as long as the window width in the z-direction is proportional to $\sin(2\pi/P)x$ for $x=0$ to $P/2$ (P is the pitch of the windows of the main scale 2). For example, a shape shown in FIG. 14 may be employed. In FIG. 14, coefficients a and b can be properly changed.

Furthermore, even if the light-receiving surface window shape is slightly shifted from the shape ($\sin(2\pi/P)x$), some of the effects of the present invention can be obtained.

In the above description, the light-receiving surface window shape is formed by shielding the light-receiving surface of the photodiode with a mask. However, the light-receiving surface itself of the photodiode may have the above-mentioned shape.

Each of the four phase photodiodes (41, 42, 43, and 44) shown in FIG. 5 may have two or more light-receiving surface windows at the pitch P of the slit-like openings of the main scale 2. In this manner, the output can be increased, and the influence due to, e.g., attachment of dust can be eliminated.

Furthermore, the present invention is not limited to four phase photodiodes, but may be similarly applied to two phase outputs. In place of photodiodes, other photoelectric transducers may be used, as a matter of course.

The present invention is not limited to a linear encoder, but may be similarly applied to a rotary encoder to obtain the same effects as described above.

What is claimed is:

1. An encoder comprising:

detection means for detecting a displacement of a movable portion;

generating means for generating multiple phase periodic signals of at least three different phases, which signals change according to the displacement;

selection means for selecting one of the multiple phase periodic signals;

giving means for giving a predetermined offset to the selected signal;

driving means for displacing said movable portion, said driving means being controlled based on an output signal from said giving means; and means for changing said offset while the selected signal is switched by said selection means when said offset is a predetermined value.

2. An encoder according to claim 1, wherein said detection means generates two phase periodic signals, and said generation means produces other periodic signals using the two phase periodic signals, thereby generating the multiple phase periodic signals.

3. An encoder according to claim 1, wherein said detection means comprises means for optically detecting the displacement of said movable portion.

4. An encoder comprising:

detection means for detecting a displacement of a movable portion;

generating means for generating multiple phase periodic signals which signals change according to the displacement;

selection means for selecting one of the multiple phase periodic signals;

giving means for giving an offset to the selected signal;

driving means for displacing said movable portion, said driving means being controlled based on an output signal from said giving means; and means for changing said offset while the selected signal is switched by said selection means when said offset is a predetermined value.

5. An encoder according to claim 4, wherein said detection means generates two phase periodic signals, and said generation means produces other periodic signals using the two phase periodic signals, thereby generating the multiple phase periodic signals.

6. An encoder according to claim 4, wherein said detection means comprises means for optically detecting the displacement of said movable portion.

* * * * *